(12) United States Patent
Chai et al.

(10) Patent No.: US 12,276,324 B2
(45) Date of Patent: Apr. 15, 2025

(54) DRIVE APPARATUS, DUAL-MOTOR DRIVE SYSTEM, AUTOMOBILE AND DRIVE APPARATUS CONTROL METHOD

(71) Applicant: HUAWEI TECHNOLOGIES CO., LTD., Guangdong (CN)

(72) Inventors: Benben Chai, Shanghai (CN); Fengyu Liu, Shanghai (CN); Yihong Zheng, Shanghai (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 356 days.

(21) Appl. No.: 17/989,963

(22) Filed: Nov. 18, 2022

(65) Prior Publication Data

US 2023/0100807 A1 Mar. 30, 2023

Related U.S. Application Data

(63) Continuation of application No. PCT/CN2020/091109, filed on May 19, 2020.

(51) Int. Cl.
*B60K 17/04* (2006.01)
*B60K 1/02* (2006.01)
(Continued)

(52) U.S. Cl.
CPC ........... *F16H 37/0806* (2013.01); *B60K 1/02* (2013.01); *B60K 17/165* (2013.01); *B60L 15/20* (2013.01);
(Continued)

(58) Field of Classification Search
CPC ....... F16H 37/0806; F16H 57/10; B60K 1/02; B60K 17/165; B60K 7/0007;
(Continued)

(56) References Cited

U.S. PATENT DOCUMENTS 5,168,946 A * 12/1992 Dorgan ..................... B60L 7/22
475/5
2007/0213160 A1 9/2007 Lyons et al.
(Continued)

FOREIGN PATENT DOCUMENTS

| CN | 203157712 U | 8/2013 |
| CN | 103587412 A | 2/2014 |

(Continued)

OTHER PUBLICATIONS

International Search Report and Written Opinion in International Appln. No. PCT/CN2020/091109, mailed on Feb. 8, 2021, 20 pages (with English translation).

*Primary Examiner* — Justin Holmes
(74) *Attorney, Agent, or Firm* — Fish & Richardson P.C.

(57) ABSTRACT

A drive apparatus includes a first variable speed drive mechanism, a second variable speed drive mechanism, a first output half shaft, and a second output half shaft. The first variable speed drive mechanism includes a first reduction gear, a first planetary gear system, and a first brake mechanism. The second variable speed drive mechanism includes a second reduction gear, a second planetary gear system, and a second brake mechanism. The first planetary gear system includes a first sun gear, a first gear ring, a first planetary gear, and a first planet carrier. The first reduction gear is engaged with the first sun gear.

13 Claims, 31 Drawing Sheets

(51) Int. Cl.
*B60K 17/16* (2006.01)
*B60L 15/20* (2006.01)
*F16H 37/08* (2006.01)
*F16H 57/10* (2006.01)
*B60K 7/00* (2006.01)

(52) U.S. Cl.
CPC ............ *F16H 57/10* (2013.01); *B60K 7/0007* (2013.01); *B60K 2007/0061* (2013.01); *B60K 17/046* (2013.01)

(58) Field of Classification Search
CPC .......... B60K 17/046; B60K 2007/0061; B60L 15/20; B60L 2220/42; B60L 15/2036; B60L 15/2054
See application file for complete search history.

(56) References Cited

U.S. PATENT DOCUMENTS

| | | | | |
|---|---|---|---|---|
| 2013/0165293 | A1* | 6/2013 | Shinohara | ............... B60L 58/12 477/3 |
| 2014/0256493 | A1* | 9/2014 | Knoblauch | .......... B60K 17/046 475/151 |

FOREIGN PATENT DOCUMENTS

| | | | | |
|---|---|---|---|---|
| CN | 103072472 | B | | 12/2015 |
| CN | 107878171 | A | | 4/2018 |
| CN | 207190794 | U | | 4/2018 |
| CN | 109715431 | A | | 5/2019 |
| CN | 110789527 | A | | 2/2020 |
| CN | 110966360 | A | | 4/2020 |
| CN | 220465228 | U | * | 2/2024 |
| DE | 102023210303 | A1 | * | 4/2024 ............. B60K 17/02 |
| KR | 20220148433 | A | * | 11/2022 |

* cited by examiner

--Prior Art--

DRIVE APPARATUS, DUAL-MOTOR DRIVE SYSTEM, AUTOMOBILE AND DRIVE APPARATUS CONTROL METHOD

CROSS-REFERENCE TO RELATED APPLICATIONS

This application is a continuation of International Application No. PCT/CN2020/091109, filed on May 19, 2020, the disclosure of which is hereby incorporated by reference in its entirety.

TECHNICAL FIELD

This application relates to the field of power transmission, and in particular, to a drive apparatus, a dual-motor drive system, an automobile, a drive apparatus control method, a drive control apparatus and device, a computer-readable storage medium, and a chip.

BACKGROUND

As a core component of a pure electric vehicle, an electric drive system directly determines smoothness and economy performance of the vehicle in a use process based on a structural form and control level of the electric drive system. To balance acceleration performance and a maximum speed, most vehicles use drive motors with a large torque and a high rotation speed. This imposes a strict requirement on the drive motor and a control system. In the conventional technology, a pure electric vehicle is equipped with a two-gear automatic transmission, so that acceleration and gradeability of the vehicle can be improved without increasing power of a drive motor, and a maximum speed of the vehicle can be further increased.

FIG. 1 is a schematic diagram of a dual-motor drive system in the conventional technology. The dual-motor drive system includes two drive motors, two synchronizers, and one normally-open differential. The drive system can implement a two-gear automatic transmission function of the dual motors. EM1 and EM2 drive motors cooperate with each other to enable an electric drive system to work in a highly efficient range and eliminate power interruption during a gear shifting process. In addition, when one motor on a single side is faulty, the other motor can be used to drive the vehicle to travel in a centralized manner, so that the vehicle has drive redundancy.

However, the foregoing dual-motor drive system cannot implement separate second-gear drive of the left motor and separate first-gear drive of the right motor, so that economic range of the system is limited. In addition, torque vector control of the left and right wheels cannot be met. In this case, when a wheel on a single side encounters an obstacle, vehicle passability is reduced.

SUMMARY

Embodiments of this application disclose a drive apparatus, a dual-motor drive system, an automobile, a drive apparatus control method, a drive control apparatus and device, a computer-readable storage medium, and a chip, so as to implement separate torque control of a left wheel and a right wheel, and significantly improve vehicle passability when a wheel on a single side encounters an obstacle. A two-gear automatic transmission system is equipped for driving one each side, so that power and economy performance of the entire drive system are improved.

According to a first aspect, an embodiment of this application provides a drive apparatus, including a first variable speed drive mechanism, a second variable speed drive mechanism, a first output half shaft, and a second output half shaft. The first variable speed drive mechanism includes a first reduction gear, a first planetary gear system, and a first brake mechanism. The second variable speed drive mechanism includes a second reduction gear, a second planetary gear system, and a second brake mechanism.

The first planetary gear system includes a first sun gear, a first gear ring, a first planetary gear engaged between the first sun gear and the first gear ring, and a first planet carrier connected to the first planetary gear. The first reduction gear is engaged with the first sun gear, and the first planet carrier is connected to the first output half shaft. The first brake mechanism is engaged with the first gear ring, and is configured to control the first gear ring to be locked or control the first gear ring to be connected to the first planet carrier.

The second planetary gear system includes a second sun gear, a second gear ring, a second planetary gear engaged between the second sun gear and the second gear ring, and a second planet carrier connected to the second planetary gear. The second reduction gear is engaged with the second sun gear, and the second planet carrier is connected to the second output half shaft. The second brake mechanism is engaged with the second gear ring, and is configured to control the second gear ring to be locked or control the second gear ring to be connected to the second planet carrier.

The first output half shaft and the second output half shaft may be switched between engagement and disengagement.

In this embodiment of this application, the first variable speed drive mechanism and the second variable speed drive mechanism can flexibly implement two-gear automatic transmission for driving on each side, and therefore, power and economy performance of the entire drive system are improved. In addition, torque of a left wheel and torque of a right wheel can be independently controlled. In this case, when a wheel on a single side encounters an obstacle, vehicle passability is significantly improved. In addition, the first output half shaft and the second output half shaft are switched between the engagement and the disengagement, so that switching between two modes of distributed drive and centralized drive can be implemented. In addition, redundancy backup of the distributed drive and the centralized drive is provided, so that the vehicle has excellent power, economy performance, maneuverability, passability, and off-road performance.

In a possible implementation, the first reduction gear may be connected to the first input shaft, and the second reduction gear may be connected to the second input shaft. The first input shaft is connected to a first motor, and the second input shaft is connected to a second motor. The first output half shaft is connected to a first wheel, and the second output half shaft is connected to a second wheel. The drive apparatus in this application may also include the first input shaft and the second input shaft. In this embodiment of this application, eight drive modes may be flexibly implemented based on a motion state of the vehicle.

Drive mode 1, namely a first-gear dual-motor distributed drive mode: The first output half shaft and the second output half shaft are disengaged, the first brake mechanism controls the first gear ring to be locked, and the second brake mechanism controls the second gear ring to be locked. After first-stage deceleration, torque of the motors on both sides is output by using a planet carrier, and the torque of the left and right wheels may be independently adjusted to implement a good steering characteristic. When the vehicle turns, the vehicle may be in a neutral steering range. For a case in which the vehicle has a large torque requirement in a working condition like an icy or waterlogged road, and output torque of the left and right wheels may be different, the vehicle passability may be improved by controlling the output torque of the left and right wheels. Therefore, the vehicle is applicable to the working condition like the icy or waterlogged road.

Drive mode 2, namely a second-gear dual-motor distributed drive mode: The first output half shaft and the second output half shaft are disengaged, the first brake mechanism controls the first gear ring to be connected to the first planet carrier, and the second brake mechanism controls the second gear ring to be connected to the second planet carrier. The first planetary gear system and the second planetary gear system are in a direct gear state. When the vehicle runs at a high speed, economy performance can be improved, so that a drive motor is ensured to better work in an economic range. In addition, torque of the left and right wheels can be adjusted in real time to implement a better steering characteristic.

Drive mode 3, namely a first-gear first motor centralized drive mode: The first output half shaft and the second output half shaft are engaged. The first brake mechanism controls the first gear ring to be locked, and the second brake mechanism is located in a neutral gear state, so as to disconnect a power output source of the second motor In a driving process of the vehicle, when the first motor needs to independently drive the left and right wheels in a centralized manner, for example, the second motor or the second brake mechanism suddenly fails, the first motor independently drives the left and right wheels in a centralized manner.

Drive mode 4, namely a first-gear second motor centralized drive mode: The first output half shaft and the second output half shaft are engaged. The second brake mechanism controls the second gear ring to be locked, and the first brake mechanism is located in a neutral gear state, so as to disconnect a power output source of the first motor. In a driving process of the vehicle, when the second motor needs to independently drive the left and right wheels in a centralized manner, for example, the first motor or the first brake mechanism suddenly fails, the second motor independently drives the left and right wheels in a centralized manner.

Drive mode 5, namely a first-gear dual-motor centralized drive mode: The first output half shaft and the second output half shaft are engaged. The first brake mechanism controls the first gear ring to be locked, and the second brake mechanism controls the second gear ring to be locked, so that power of the two motors is superimposed and then output to a drive wheel. This resolves a problem that when an attachment coefficient of a road surface is low, a single motor usually cannot meet a drive torque requirement. Further, collaborative drive of the two motors working in the first gear can ensure output torque when a vehicle speed is low.

Drive mode 6, namely a second-gear dual-motor centralized drive mode: The first output half shaft and the second output half shaft are engaged. The first brake mechanism controls the first gear ring to be connected to the first planet carrier, and the second brake mechanism controls the second gear ring to be connected to the second planet carrier, so that power of the two motors is superimposed and then output to a drive wheel. This resolves a problem that when an attachment coefficient of a road surface is low, a single motor usually cannot meet a drive torque requirement. Further, collaborative drive of the two motors working in the second gear can ensure output torque when a vehicle speed is high. In addition, a rotation speed of the motor can well match the vehicle speed.

Drive mode 7, namely a second-gear first motor centralized drive mode: The first output half shaft and the second output half shaft are engaged. The first brake mechanism controls the first gear ring to be connected to the first planet carrier, and the second brake mechanism is located in a neutral gear state, so as to disconnect a power output source of the second motor. In a driving process of the vehicle, when the first motor needs to independently drive the left and right wheels in a centralized manner, for example, the second motor or the second brake mechanism suddenly fails, the first motor can independently drive the left and right wheels in a centralized manner, to match a high vehicle speed.

Drive mode 8, namely a second-gear second motor centralized drive mode: The first output half shaft and the second output half shaft are engaged. The second brake mechanism controls the second gear ring to be connected to the second planet carrier, and the first brake mechanism is located in a neutral gear state, so as to disconnect a power output source of the first motor. In a driving process of the vehicle, when the second motor needs to independently drive the left and right wheels in a centralized manner, for example, the first motor or the first brake mechanism suddenly fails, the second motor can independently drive the left and right wheels in a centralized manner, to match a high vehicle speed.

In a possible implementation, the first brake mechanism may be connected to a housing of the drive apparatus or the first planet carrier.

When the first brake mechanism is connected to the housing of the drive apparatus, the first gear ring is locked. When the first brake mechanism is connected to the first planet carrier, a rotation speed of the first sun gear, a rotation speed of the first planetary gear, and a rotation speed of the first gear ring are the same.

In this embodiment of this application, automatic switching between two gears can be implemented by connecting the first brake mechanism to the housing of the drive apparatus or the first planet carrier. When the first brake mechanism is connected to the housing of the drive apparatus, power of the vehicle can be improved, and when the first brake mechanism is connected to the first planet carrier, economy performance of the vehicle can be significantly improved.

In a possible implementation, the second brake mechanism may be connected to the housing of the drive apparatus or the second planet carrier.

When the second brake mechanism is connected to the housing of the drive apparatus, the second gear ring is locked. When the second brake mechanism is connected to the second planet carrier, a rotation speed of the second sun gear, a rotation speed of the second planetary gear, and a rotation speed of the second gear ring are the same.

In this embodiment of this application, automatic switching between two gears can be implemented by connecting the second brake mechanism to the housing of the drive apparatus or the second planet carrier. When the second brake mechanism is connected to the housing of the drive apparatus, power of the vehicle can be improved, and when the second brake mechanism is connected to the second planet carrier, economy performance of the vehicle can be significantly improved.

In a possible implementation, the first brake mechanism is a synchronizer or a sliding clutch, and/or the second brake mechanism is a synchronizer or a sliding clutch.

In this embodiment of this application, sliding of the synchronizer or the sliding clutch may be controlled, so that the synchronizer or the sliding clutch is switched between the housing of the drive apparatus and the planet carrier, to implement automatic switching between two gears.

In a possible implementation, switching between the engagement and the disengagement is implemented between the first output half shaft and the second output half shaft by using a dog clutch.

In this embodiment of this application, centralized drive and distributed drive may be implemented by using the dog clutch, so as to omit a differential assembly of a conventional transmission, resolve a problem that a structure size of a drive system increases significantly due to a conventional differential structure, and enable the vehicle to have excellent power, economy performance, maneuverability, passability, and off-road performance while a size of a power assembly is reduced.

According to a second aspect, an embodiment of this application discloses a dual-motor drive system, including a first motor, a second motor, and the drive apparatus provided in any implementation of the first aspect. The first motor is connected to a first input shaft, the second motor is connected to a second input shaft, a first reduction gear is connected to the first input shaft, and a second reduction gear is connected to the second input shaft.

According to a third aspect, an embodiment of this application discloses an automobile, including two front wheels, two rear wheels, a first axle connecting the two front wheels, a second axle connecting the two rear wheels, and the dual-motor drive system provided in the second aspect. A drive apparatus of the dual-motor drive system is integrated on the first axle and/or the second axle.

In other words, the foregoing automobile may implement eight drive modes, such as a single-motor centralized two-gear variable speed drive mode, a dual-motor centralized two-gear drive mode, and a dual-motor distributed two-gear variable speed drive mode. First-gear drive may be used when the vehicle starts and accelerates, second-gear drive may be used during high-speed cruise, centralized drive is used on an urban road, dual-motor drive is used in a mountainous and extreme working condition, and a redundant drive structure may be used when a single motor is faulty. In addition, the vehicle can be flexibly switched according to a driver's requirement and a driving condition, so that torque vector control of the left and right wheels can be implemented, and a differential assembly of a conventional transmission can be omitted. The vehicle has excellent power, economy performance, maneuverability, passability, and off-road performance on the premise that a size of a power assembly is reduced. In addition, the dual-motor drive system can be flexibly configured for a front-drive, rear-drive, or four-drive vehicle model, to further improve vehicle power and economy performance.

According to a fourth aspect, an embodiment of this application discloses a drive apparatus control method, configured to control the drive apparatus provided in any implementation of the first aspect, and including:
  obtaining a drive mode and a gear mode of an automobile based on motion state information of the automobile;
  controlling, according to the drive mode, a first output half shaft and a second output half shaft to be engaged or disengaged; and
  controlling, by using a first brake mechanism, a first gear ring to be locked or controlling a first gear ring to be connected to a first planet carrier according to the gear mode, and/or controlling, by using a second brake mechanism, a second gear ring to be locked or controlling a second gear ring to be connected to a second planet carrier.

The drive apparatus includes a first variable speed drive mechanism, a second variable speed drive mechanism, a first output half shaft, and a second output half shaft. The first variable speed drive mechanism includes a first reduction gear, a first planetary gear system, and a first brake mechanism. The second variable speed drive mechanism includes a second reduction gear, a second planetary gear system and a second brake mechanism.

The first planetary gear system includes a first sun gear, a first gear ring, a first planetary gear engaged between the first sun gear and the first gear ring, and a first planet carrier connected to the first planetary gear. The first reduction gear is engaged with the first sun gear, and the first planet carrier is connected to the first output half shaft. The first brake mechanism is engaged with the first gear ring, and is configured to control the first gear ring to be locked or control the first gear ring to be connected to the first planet carrier.

The second planetary gear system includes a second sun gear, a second gear ring, a second planetary gear engaged between the second sun gear and the second gear ring, and a second planet carrier connected to the second planetary gear. The second reduction gear is engaged with the second sun gear, and the second planet carrier is connected to the second output half shaft. The second brake mechanism is engaged with the second gear ring, and is configured to control the second gear ring to be locked or control the second gear ring to be connected to the second planet carrier.

The first output half shaft and the second output half shaft may be switched between engagement and disengagement.

In a possible implementation, when the drive mode is the distributed drive mode, and the gear mode is a first-gear drive mode,
  the controlling, according to the drive mode, a first output half shaft and a second output half shaft to be engaged or disengaged includes: controlling the first output half shaft and the second output half shaft to be disengaged.

The controlling, by using a first brake mechanism, a first gear ring to be locked or controlling a first gear ring to be connected to a first planet carrier according to the gear mode, and/or controlling, by using a second brake mechanism, a second gear ring to be locked or controlling a second gear ring to be connected to a second planet carrier includes: controlling, by using the first brake mechanism, the first gear ring to be locked, and controlling, by using the second brake mechanism, the second gear ring to be locked.

In a possible implementation, when the drive mode is the distributed drive mode, and the gear mode is a second-gear drive mode,
  the controlling, according to the drive mode, a first output half shaft and a second output half shaft to be engaged or disengaged includes: controlling the first output half shaft and the second output half shaft to be disengaged.

The controlling, by using a first brake mechanism, a first gear ring to be locked or controlling a first gear ring to be connected to a first planet carrier according to the gear mode, and/or controlling, by using a second brake mechanism, a second gear ring to be locked or controlling a second gear ring to be connected to a second planet carrier includes: controlling, by using the first brake mechanism, the first gear ring to be connected to the first planet carrier, and controlling, by using the second brake mechanism, the second gear ring to be connected to the second planet carrier.

In a possible implementation, when the drive mode is a centralized drive mode, and the gear mode is the first-gear drive mode, the controlling, according to the drive mode, a first output half shaft and a second output half shaft to be engaged or disengaged includes: controlling the first output half shaft and the second output half shaft to be engaged.

The controlling, by using a first brake mechanism, a first gear ring to be locked or controlling a first gear ring to be connected to a first planet carrier according to the gear mode, and/or controlling, by using a second brake mechanism, a second gear ring to be locked or controlling a second gear ring to be connected to a second planet carrier includes: controlling, by using the first brake mechanism, the first gear ring to be locked, where the second brake mechanism is located in a neutral gear; or controlling, by using the second brake mechanism, the second gear ring to be locked, where the first brake mechanism is located in a neutral gear; or, controlling, by using the first brake mechanism, the first gear ring to be locked and controlling, by using the second brake mechanism, the second gear ring to be locked.

In a possible implementation, when the drive mode is the centralized drive mode, and the gear mode is the second-gear drive mode, the controlling, according to the drive mode, a first output half shaft and a second output half shaft to be engaged or disengaged includes: controlling the first output half shaft and the second output half shaft to be engaged.

The controlling, by using a first brake mechanism, a first gear ring to be locked or controlling a first gear ring to be connected to a first planet carrier according to the gear mode, and/or controlling, by using a second brake mechanism, a second gear ring to be locked or controlling a second gear ring to be connected to a second planet carrier includes: controlling, by using the first brake mechanism, the first gear ring to be connected to the first planet carrier, where the second brake mechanism is located in a neutral gear: or controlling, by using the second brake mechanism, the second gear ring to be connected to the second planet carrier, where the first brake mechanism is located in a neutral gear; or controlling, by using the first brake mechanism, the first gear ring to be connected to the first planet carrier, and controlling, by using the second brake mechanism, the second gear ring to be connected to the second planet carrier.

In a possible implementation, the first brake mechanism may be connected to a housing of the drive apparatus or the first planet carrier.

When the first brake mechanism is connected to the housing of the drive apparatus, the first gear ring is locked. When the first brake mechanism is connected to the first planet carrier, a rotation speed of the first sun gear, a rotation speed of the first planetary gear, and a rotation speed of the first gear ring are the same.

In a possible implementation, the second brake mechanism may be connected to the housing of the drive apparatus or the second planet carrier.

When the second brake mechanism is connected to the housing of the drive apparatus, the second gear ring is locked. When the second brake mechanism is connected to the second planet carrier, a rotation speed of the second sun gear, a rotation speed of the second planetary gear, and a rotation speed of the second gear ring are the same.

In a possible implementation, the first brake mechanism is a synchronizer or a sliding clutch, and/or the second brake mechanism is a synchronizer or a sliding clutch.

In a possible implementation, switching between the engagement and the disengagement is implemented between the first output half shaft and the second output half shaft by using a dog clutch.

According to a fifth aspect, an embodiment of this application discloses a drive control apparatus, configured to control the drive apparatus provided in any implementation of the first aspect, including:

an obtaining unit, configured to obtain a drive mode and a gear mode of an automobile based on motion state information of the automobile;

a first control unit, configured to control, according to the drive mode, a first output half shaft and a second output half shaft to be engaged or disengaged; and a second control unit, configured to control, by using a first brake mechanism, a first gear ring to be locked or control a first gear ring to be connected to a first planet carrier according to the gear mode, and/or control, by using a second brake mechanism, a second gear ring to be locked or control a second gear ring to be connected to a second planet carrier.

The drive apparatus includes a first variable speed drive mechanism, a second variable speed drive mechanism, a first output half shaft, and a second output half shaft. The first variable speed drive mechanism includes a first reduction gear, a first planetary gear system, and a first brake mechanism. The second variable speed drive mechanism includes a second reduction gear, a second planetary gear system and a second brake mechanism.

The first planetary gear system includes a first sun gear, a first gear ring, a first planetary gear engaged between the first sun gear and the first gear ring, and a first planet carrier connected to the first planetary gear. The first reduction gear is engaged with the first sun gear, and the first planet carrier is connected to the first output half shaft. The first brake mechanism is engaged with the first gear ring, and is configured to control the first gear ring to be locked or control the first gear ring to be connected to the first planet carrier.

The second planetary gear system includes a second sun gear, a second gear ring, a second planetary gear engaged between the second sun gear and the second gear ring, and a second planet carrier connected to the second planetary gear. The second reduction gear is engaged with the second sun gear, and the second planet carrier is connected to the second output half shaft. The second brake mechanism is engaged with the second gear ring, and is configured to control the second gear ring to be locked or control the second gear ring to be connected to the second planet carrier.

The first output half shaft and the second output half shaft may be switched between engagement and disengagement.

In a possible implementation, when the drive mode obtained by the obtaining unit is a distributed drive mode, and the gear mode is a first-gear drive mode, the first control unit is specifically configured to control the first output half shaft and the second output half shaft to be disengaged.

The second control unit is specifically configured to control, by using the first brake mechanism, the first gear ring to be locked, and control, by using the second brake mechanism, the second gear ring to be locked.

In a possible implementation, when the drive mode obtained by the obtaining unit is the distributed drive mode, and the gear mode is the first-gear drive mode, the first control unit is specifically configured to control the first output half shaft and the second output half shaft to be disengaged.

The second control unit is specifically configured to control, by using the first brake mechanism, the first gear ring to be connected to the first planet carrier, and control, by using the second brake mechanism, the second gear ring to be connected to the second planet carrier.

In a possible implementation, when the drive mode obtained by the obtaining unit is a centralized drive mode, and the gear mode is the first-gear drive mode, the first control unit is specifically configured to control the first output half shaft and the second output half shaft to be engaged.

The second control unit is specifically configured to: control, by using the first brake mechanism, the first gear ring to be locked, where the second brake mechanism is located in a neutral gear: or control, by using the second brake mechanism, the second gear ring to be locked, where the first brake mechanism is located in a neutral gear; or control, by using the first brake mechanism, the first gear ring to be locked, and control, by using the second brake mechanism, the second gear ring to be locked.

In a possible implementation, when the drive mode obtained by the obtaining unit is the centralized drive mode, and the gear mode is a second-gear drive mode, the first control unit is specifically configured to control the first output half shaft and the second output half shaft to be engaged.

The second control unit is specifically configured to: control, by using the first brake mechanism, the first gear ring to be connected to the first planet carrier, where the second brake mechanism is located in the neutral gear; or control, by using the second brake mechanism, the second gear ring to be connected to the second planet carrier, where the first brake mechanism is located in the neutral gear; or control, by using the first brake mechanism, the first gear ring to be connected to the first planet carrier, and control, by using the second brake mechanism, the second gear ring to be connected to the second planet carrier.

In a possible implementation, the first brake mechanism may be connected to a housing of the drive apparatus or the first planet carrier.

When the first brake mechanism is connected to the housing of the drive apparatus, the first gear ring is locked. When the first brake mechanism is connected to the first planet carrier, a rotation speed of the first sun gear, a rotation speed of the first planetary gear, and a rotation speed of the first gear ring are the same.

In a possible implementation, the second brake mechanism may be connected to the housing of the drive apparatus or the second planet carrier.

When the second brake mechanism is connected to the housing of the drive apparatus, the second gear ring is locked. When the second brake mechanism is connected to the second planet carrier, a rotation speed of the second sun gear, a rotation speed of the second planetary gear, and a rotation speed of the second gear ring are the same.

In a possible implementation, the first brake mechanism is a synchronizer or a sliding clutch, and/or the second brake mechanism is a synchronizer or a sliding clutch.

In a possible implementation, switching between the engagement and the disengagement is implemented between the first output half shaft and the second output half shaft by using a dog clutch.

According to a sixth aspect, an embodiment of this application discloses a drive control device. The drive control device includes at least one processor and a memory, the memory is configured to store program code, and the at least one processor is configured to invoke the program code to perform the drive apparatus control method provided in any implementation of the fourth aspect.

According to a seventh aspect, an embodiment of this application discloses a computer-readable storage medium, including computer instructions. When the computer instructions are run on an electronic device, the electronic device is enabled to perform the drive apparatus control method provided in any implementation of the fourth aspect.

According to an eighth aspect, an embodiment of this application discloses a computer program product. When the computer program product runs on an electronic device, the electronic device is enabled to perform the drive apparatus control method provided in any implementation of the fourth aspect.

According to a ninth aspect, an embodiment of this application discloses a chip. The chip includes at least one processor, a memory, and an interface circuit. The memory, the interface circuit, and the at least one processor are interconnected through lines. The at least one memory stores instructions, and when the instructions are executed by the processor, the drive apparatus control method provided in any implementation of the fourth aspect is implemented.

It may be understood that for beneficial effects of the second aspect to the ninth aspect provided above, refer to beneficial effects of the drive apparatus provided in the first aspect. Details are not described herein again.

DESCRIPTION OF EMBODIMENTS

The following describes embodiments of this application with reference to the accompanying drawings in embodiments of this application.

In the specification, claims, and accompanying drawings of this application, the terms "first", "second", "third", "fourth" and so on are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

An "embodiment" mentioned in this specification means that a particular characteristic, structure, or feature described with reference to embodiments may be included in at least one embodiment of this application. The phrase shown in various locations in the specification may not necessarily refer to a same embodiment, and is not an independent or optional embodiment exclusive from another embodiment. It is explicitly and implicitly understood by a person skilled in the art that embodiments described in the specification may be combined with another embodiment.

Terminologies such as "component", "module", and "system" used in this specification are used to indicate computer-related entities, hardware, firmware, a combination of hardware and software, software, or software being executed. For example, a component may be, but is not limited to, a process that runs on a processor, a processor, an object, an executable file, an execution thread, a program, and/or a computer.

Embodiments of this application provide a drive apparatus and a dual-motor drive system, which can be used in various types of automobiles or vehicles to provide or transfer kinetic energy for the automobiles. The automobile may be a car, a sport utility vehicle (sport utility vehicle, SUV) or a commercial vehicle like a truck or a freight car. The drive apparatus and the dual-motor drive system provided in embodiments of this application may also be applied to a new energy vehicle, a connected vehicle, a smart vehicle, or an unmanned vehicle.

Figure 1:
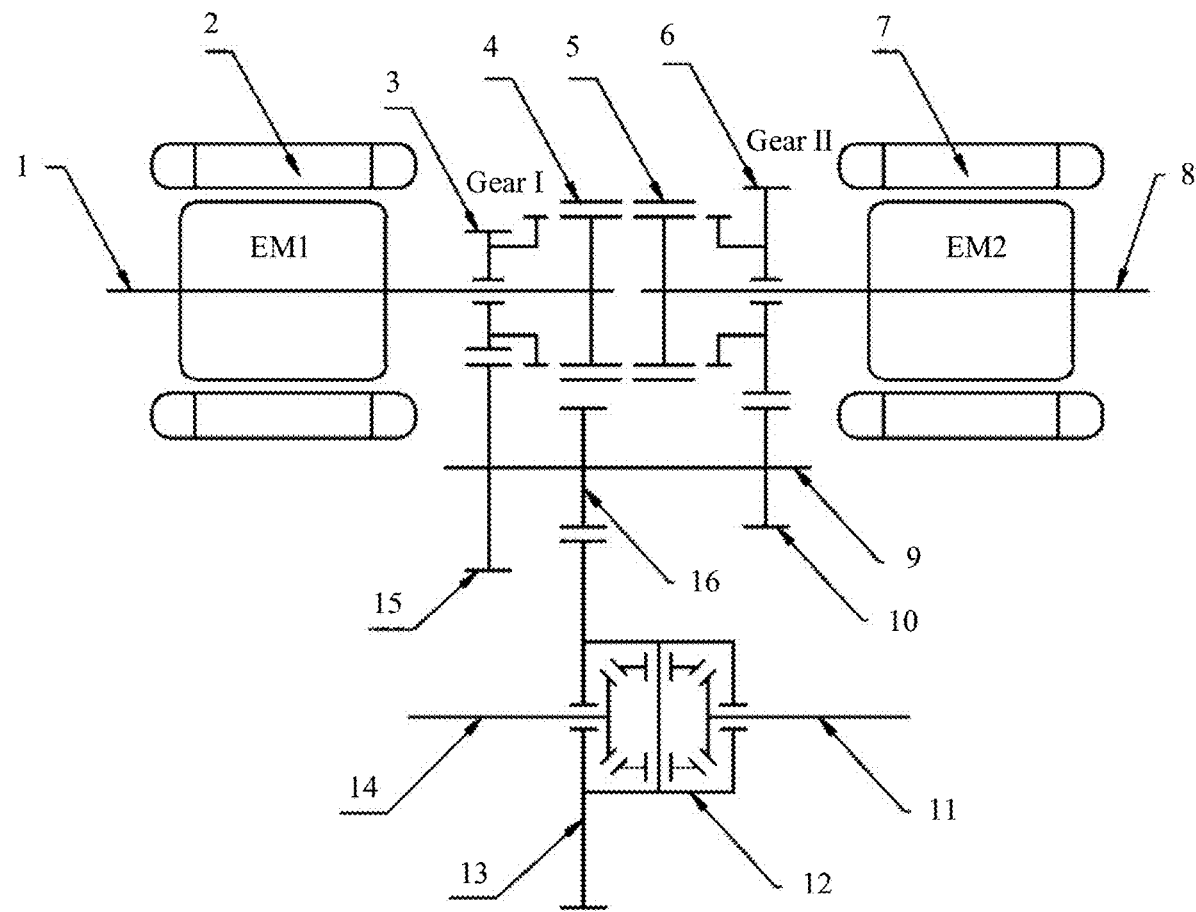
FIG. 1 is a schematic diagram of a dual-motor drive system in the conventional technology.
Figure 2A:
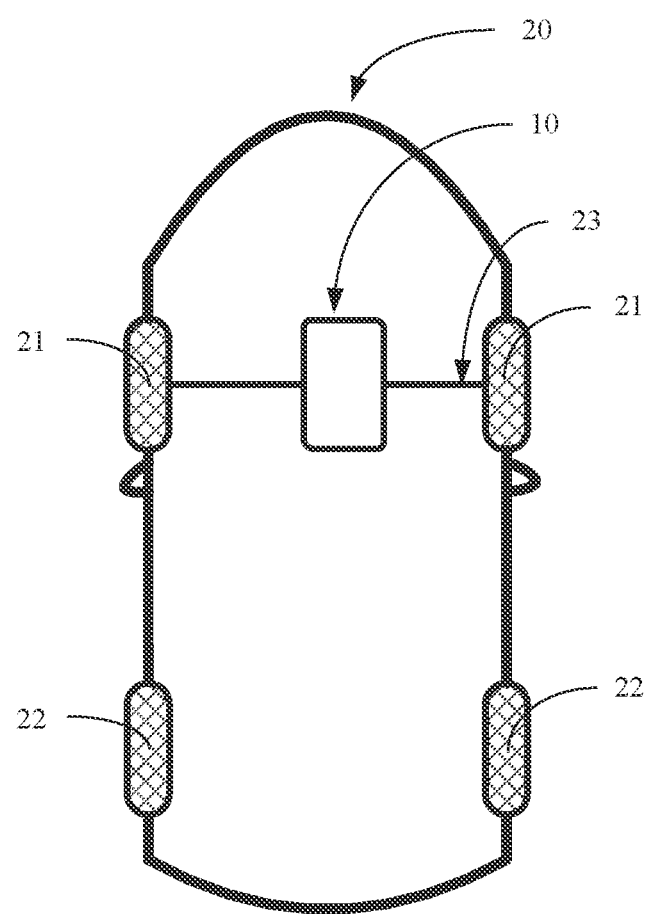
FIG. 2A is a schematic diagram of a structure of an automobile according to an embodiment of this application.
Figure 2B:
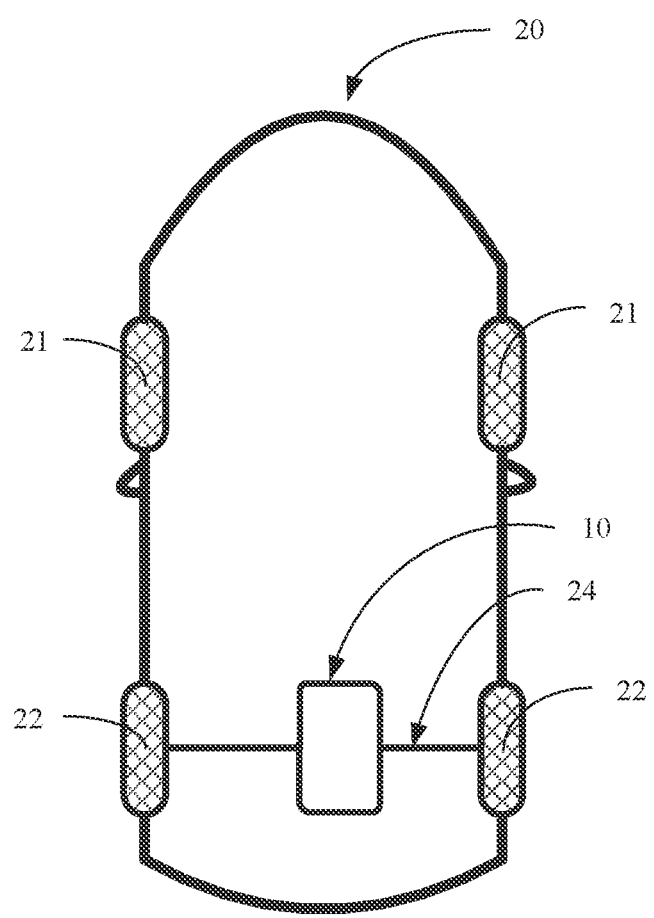
FIG. 2B is a schematic diagram of a structure of an automobile according to another embodiment of this application.
Figure 3:
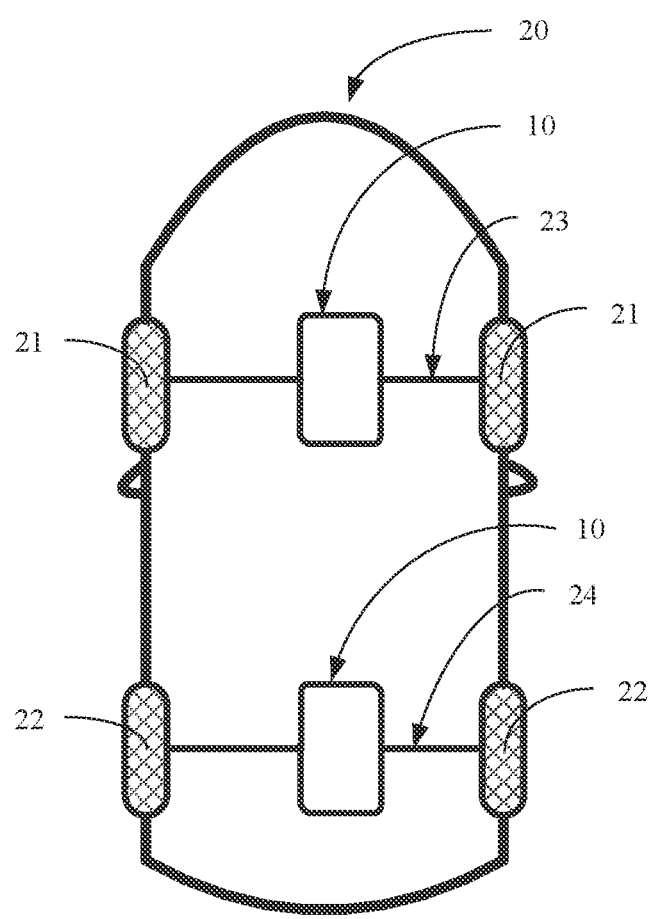
FIG. 3 is a schematic diagram of a structure of an automobile according to still another embodiment of this application.

This application is described by using an example in which the drive apparatus is applied to an automobile. Refer to FIG. 2A, FIG. 2B, and FIG. 3. An embodiment of this application provides an automobile 20. The automobile 20 includes two front wheels 21, two rear wheels 22, a first axle 23 connecting the two front wheels 21, a second axle 24 connecting the two rear wheels 22, a first motor 25, a second motor 26, and a drive apparatus 10. The drive apparatus 10 may be integrated on the first axle 23 and/or the second axle 24.

Refer to FIG. 2A. The drive apparatus 10 in FIG. 2A is integrated on the first axle 23 as a front drive system of the automobile 20.

Refer to FIG. 2B. The drive apparatus 10 in FIG. 2B is integrated on the second axle 24 as a rear drive system of the automobile 20.

Refer to FIG. 3. There may be two groups of drive apparatuses 10 in FIG. 3, which are respectively integrated on the first axle 23 and the second axle 24. That is, the automobile 20 in this embodiment is a front-to-back four-drive system, and has good drive performance. This embodiment of this application is not limited to a four-drive structure in FIG. 3. Alternatively, there may be only one group of drive apparatuses 10, and front and rear wheels distribute power for driving by using a power distributor.

According to the drive apparatus 10 in this embodiment of this application, a problem in the conventional technology that torque vector control of left and right wheels cannot be met is resolved, and torque of the left and right wheels can be independently controlled. When a wheel on a single side encounters an obstacle, vehicle passability is significantly improved. In addition, a two-gear automatic transmission system is equipped for driving on each side, to improve power and economy performance of the entire drive system. The following provides a description with reference to FIG. 4 that is a schematic diagram of a structure of a drive apparatus according to an embodiment of this application.

The drive apparatus 10 may include a first variable speed drive mechanism 11, a second variable speed drive mechanism 12, a first output half shaft 13, and a second output half shaft 14. The first variable speed drive mechanism 11 may include a first reduction gear 110, a first planetary gear system 111, and a first brake mechanism 112. The second variable speed drive mechanism 12 includes a second reduction gear 120, a second planetary gear system 121, and a second brake mechanism 122.

The first planetary gear system 111 may include a first sun gear 1110, a first gear ring 1111, a first planetary gear (not shown in the figure) engaged between the first sun gear 1110 and the first gear ring 111, and a first planet carrier 1112 connected to the first planetary gear. The first reduction gear 110 is engaged with the first sun gear 1110, and the first planet carrier 1112 is connected to the first output half shaft 13. The first brake mechanism 112 is engaged with the first gear ring 1111, and is configured to control the first gear ring 1111 to be locked or control the first gear ring 1111 to be connected to the first planet carrier 1112.

The second planetary gear system 121 includes a second sun gear 1210, a second gear ring 1211, a second planetary gear (not shown in the figure) engaged between the second sun gear 1210 and the second gear ring 1211, and a second planet carrier 1212 connected to the second planetary gear. The second reduction gear 120 is engaged with the second sun gear 1210, and the second planet carrier 1212 is connected to the second output half shaft 14. The second brake mechanism 122 is engaged with the second gear ring 1211, and is configured to control the second gear ring 1211 to be locked or control the second gear ring 1211 to be connected to the second planet carrier 1212.

The first output half shaft 13 and the second output half shaft 14 may be switched between engagement and disengagement.

The drive apparatus 10 in this embodiment of this application is symmetrical from left to right in structure. The first variable speed drive mechanism 11 and the second variable speed drive mechanism 12 can flexibly implement two-gear automatic transmission for driving on each side. This improves power and economy performance of the entire drive system. In addition, torque of left and right wheels can be independently controlled. In this case, when a wheel on a single side encounters an obstacle, vehicle passability is significantly improved. In addition, the first output half shaft and the second output half shaft are switched between the engagement and the disengagement, so that free switching between two modes of distributed drive and centralized drive can be implemented. In addition, redundancy backup of the distributed drive and the centralized drive is provided, so that the vehicle has excellent power, economy performance, maneuverability, passability, and off-road performance.

Figure 4:
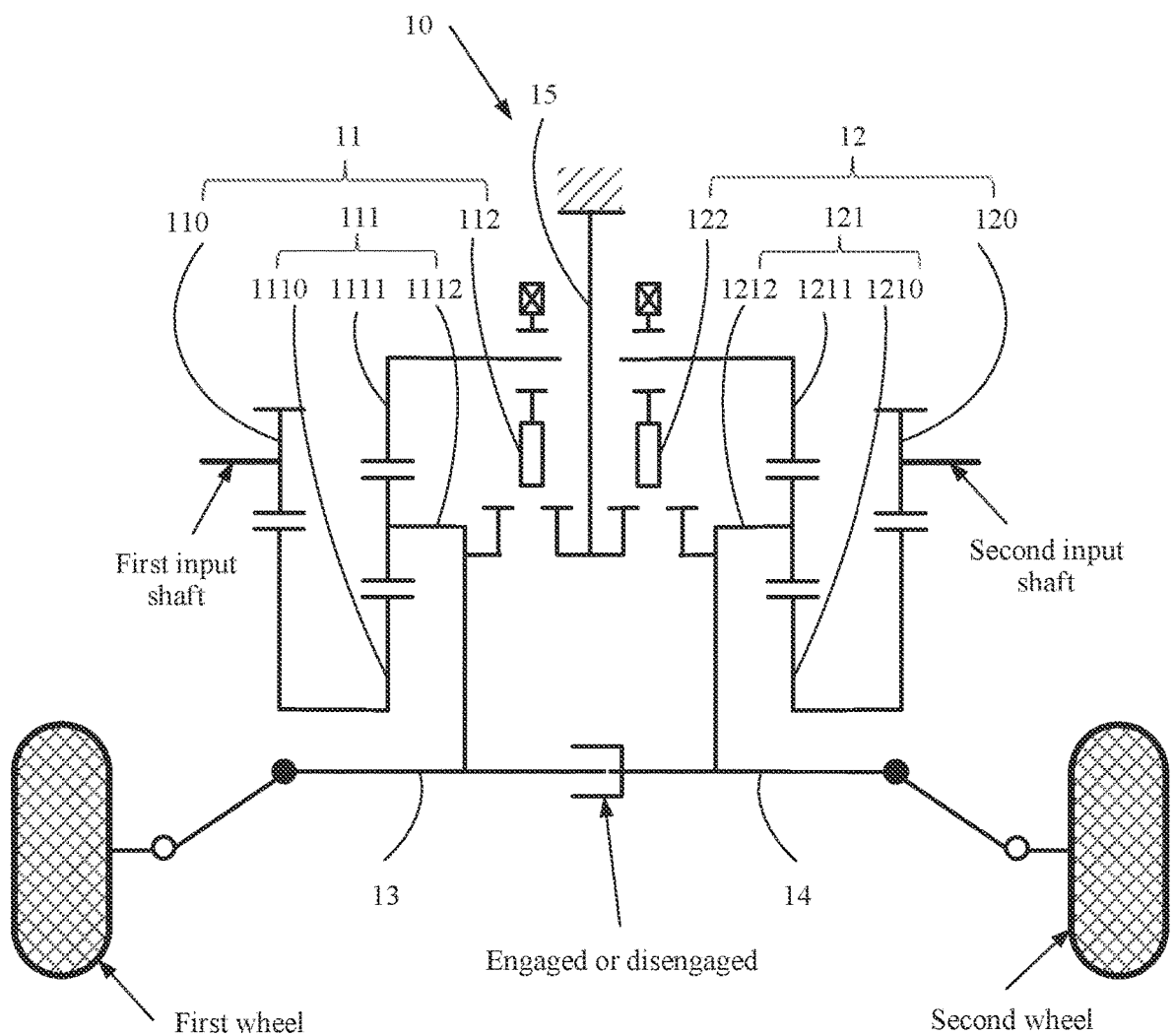
FIG. 4 is a schematic diagram of a structure of a drive apparatus according to an embodiment of this application.

In a possible implementation, the first brake mechanism 112 in FIG. 4 may be connected to a housing 15 of the drive apparatus or the first planet carrier 1112.

When the first brake mechanism 112 is connected to the housing 15 of the drive apparatus, the first gear ring 1111 is locked. In this case, power output by the motor is transmitted to the first sun gear 1110 and the first planetary gear by using the first reduction gear 110, and is output by using the first planet carrier 1112, and the vehicle is at a first-gear position.

When the first brake mechanism 112 is connected to the first planet carrier 1112, the first gear ring 1111 is directly connected to the first planet carrier 1112. Therefore, a rotation speed of the first sun gear 1110, a rotation speed of the first planetary gear, and a rotation speed of the first gear ring 1111 are the same. In this case, after the power output by the motor passes through the first reduction gear 110, the first output half shaft 13 is directly driven, and the vehicle is at a second-gear position.

In this embodiment of this application, automatic switching between two gears can be implemented by connecting the first brake mechanism 112 to the housing 15 of the drive apparatus or the first planet carrier 1112. When the first brake mechanism 112 is connected to the housing 15 of the drive apparatus, power of the vehicle can be improved, and when the first brake mechanism 112 is connected to the first planet carrier 1112, economy performance of the vehicle can be significantly improved.

In a possible implementation, the second brake mechanism 122 in FIG. 4 may be connected to the housing 15 of the drive apparatus or the second planet carrier 1212.

When the second brake mechanism 122 is connected to the housing 15 of the drive apparatus, the second gear ring 1211 is locked. In this case, power output by the motor is transmitted to the first sun gear 1110 and the first planetary gear by using the second reduction gear 120, and is output by using the first planet carrier 1112, and the vehicle is at a first-gear position.

When the second brake mechanism 122 is connected to the second planet carrier 1212, the second gear ring 1211 is directly connected to the second planet carrier 1212. Therefore, a rotation speed of the second sun gear 1210, a rotation speed of the second planetary gear, and a rotation speed of the second gear ring 1211 are the same. After the power output by the motor passes through the second reduction gear 120, the second output half shaft 14 is directly driven, and the vehicle is at a second-gear position.

In this embodiment of this application, automatic switching between two gears can be implemented by connecting the second brake mechanism 122 to the housing 15 of the drive apparatus or the second planet carrier 1212. When the second brake mechanism 122 is connected to the housing 15 of the drive apparatus, power of the vehicle can be improved, and when the second brake mechanism 122 is connected to the second planet carrier 1212, economy performance of the vehicle can be significantly improved.

In a possible implementation, the first brake mechanism 112 in this embodiment of this application may be a synchronizer or a sliding clutch, and/or the second brake mechanism 122 may be a synchronizer or a sliding clutch.

In this embodiment of this application, sliding of the synchronizer or the sliding clutch may be controlled, so that the synchronizer or the sliding clutch is switched between the housing of the drive apparatus and the planet carrier, to implement automatic switching between two gears.

In a possible implementation, switching between engagement and disengagement is implemented between the first output half shaft 13 and the second output half shaft 14 in this embodiment of this application by using a dog clutch. The switching between the engagement and the disengagement can also be realized by using a lock type differential.

In this embodiment of this application, centralized drive and distributed drive may be implemented by using the dog clutch, so as to omit a differential assembly of a conventional transmission, resolve a problem that a structure size of a drive system increases significantly due to a conventional differential structure, and enable the vehicle to have excellent power, economy performance, maneuverability, passability, and off-road performance while a size of a power assembly is reduced.

Figure 5:
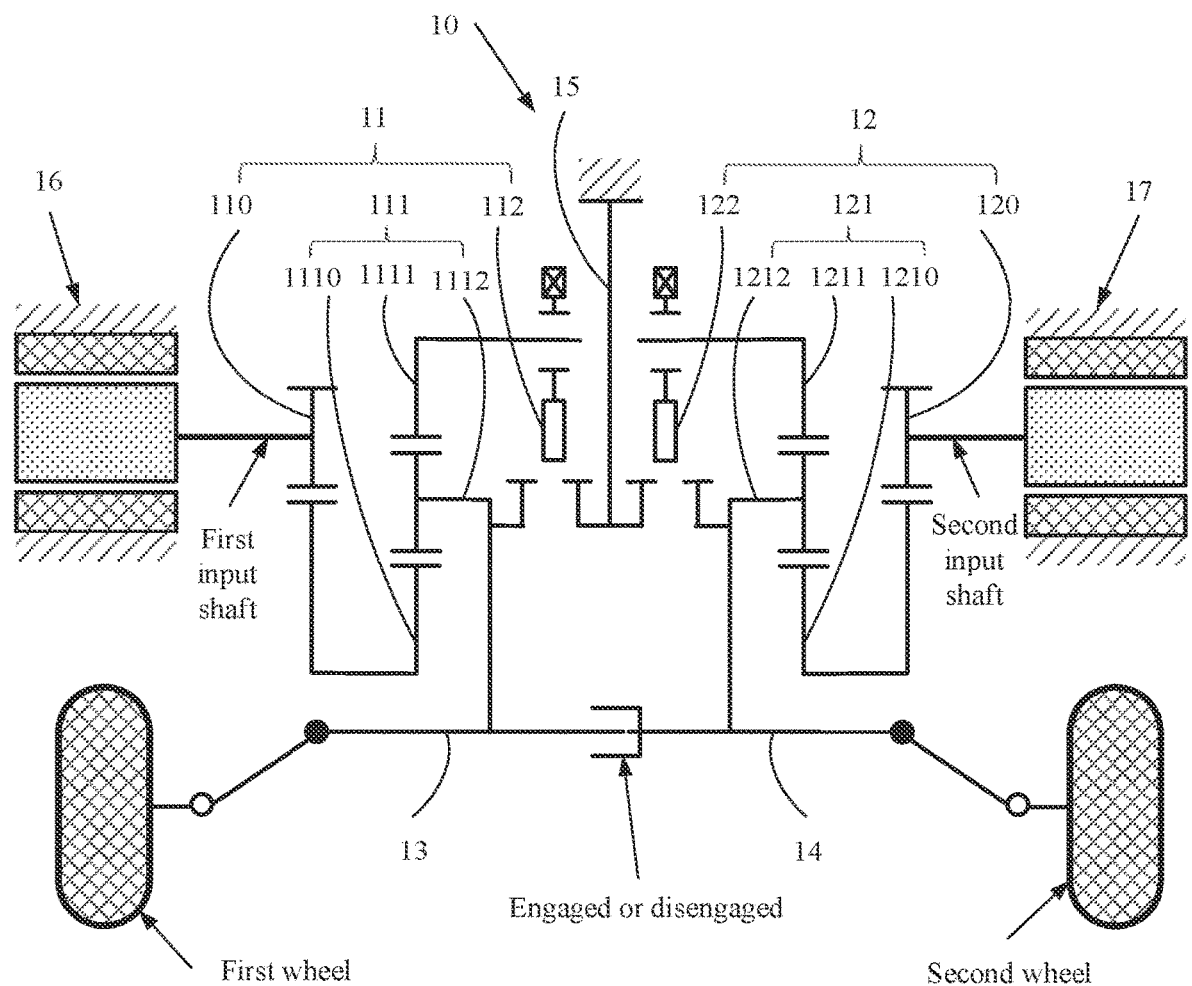
FIG. 5 is a schematic diagram of a structure of a dual-motor drive system according to an embodiment of this application.

In a possible implementation, the drive apparatus 10 in this embodiment of this application may further include a first input shaft and a second input shaft. The first reduction gear 110 may be connected to the first input shaft, and the second reduction gear 120 may be connected to the second input shaft. The first input shaft is connected to a first motor, and the second input shaft is connected to a second motor. The first output half shaft is connected to a first wheel, and the second output half shaft is connected to a second wheel. FIG. 5 is a schematic diagram of a structure of a dual-motor drive system according to an embodiment of this application. The dual-motor drive system may include a first motor 16, a second motor 17, and the drive apparatus 10. For example, a dog clutch, the first brake mechanism 112, and the second brake mechanism 122 are respectively a first synchronizer and a second synchronizer, and the synchronizer is combined with a housing of the drive apparatus to enable the vehicle to be at a first-gear position. The dual-motor drive system may flexibly implement eight drive modes in the following Table 1 according to a motion state of a vehicle.

TABLE 1

| Drive modes | | First synchronizer | Second synchronizer | Dog clutch | First motor | Second motor | Implemented auxiliary functions | Application scenarios |
|---|---|---|---|---|---|---|---|---|
| Distributed drive | 1: First-gear dual-motor distributed drive | Combined with the housing | Combined with the housing | Separated | Drive/brake | Drive/brake | Torque vector Electronic differential Energy recovery | Working conditions such as start-up, climbing, and overtaking |
| | 2: Second-gear dual-motor distributed drive | Combined with the first planet carrier | Combined with the second planet carrier | Separated | Drive/brake | Drive/brake | Torque vector Electronic differential Energy recovery | Medium-and high-speed and economic working ranges |
| Centralized drive | 3: First-gear first motor centralized drive | Combined with the housing | Separated (neutral gear) | Combined | Drive/brake | Disengaged | Torque vector Energy recovery | Second motor failure, second wheel slippage, a large torque requirement, and the like |
| | 4: First-gear second motor centralized drive | Separated (neutral gear) | Combined with the housing | Combined | Disengaged | Drive/brake | Torque vector Energy recovery | First motor failure, first wheel slippage, a large torque requirement, and the like |
| | 5: First-gear dual-motor centralized drive | Combined with the housing | Combined with the housing | Combined | Drive/brake | Drive/brake | Torque vector Energy recovery | Start-up, climbing, and low-attachment road conditions |
| | 6: Second-gear dual-motor centralized drive | Combined with the first planet carrier | Combined with the second planet carrier | Combined | Drive/brake | Drive/brake | Torque vector Energy recovery | Medium-and high-speed and economic working ranges |
| | 7: Second-gear first motor centralized drive | Combined with the first planet carrier | Combined with the housing | Combined | Drive/brake | Disengaged | Torque vector Energy recovery | Second motor failure, second wheel slippage, a small torque requirement, and the like |
| | 8: Second-gear second motor centralized drive | Combined with the housing | Combined with the second planet carrier | Combined | Disengaged | Drive/brake | Torque vector Energy recovery | First motor failure, first wheel slippage, a small torque requirement, and the like |
| Neutral gear | | Separated | Separated | Separated | Disengaged | Disengaged | | The vehicle stops normally. |

Figure 6:
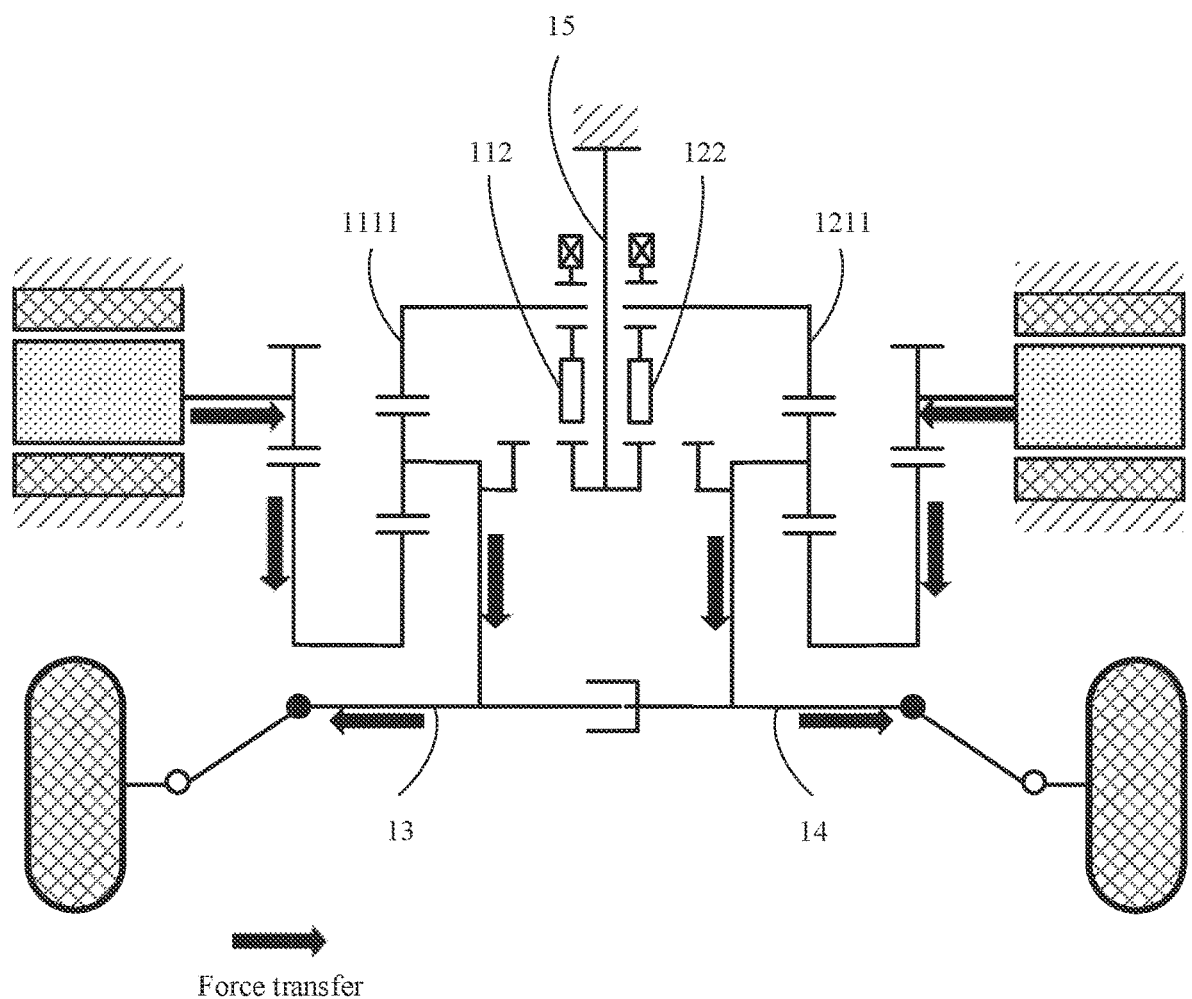
FIG. 6 is a schematic diagram of a principle of a first drive mode according to an embodiment of this application.

Specifically:

The drive mode 1 is a first-gear dual-motor distributed drive mode. FIG. 6 is a schematic diagram of a principle of a first drive mode according to an embodiment of this application. The first output half shaft 13 and the second output half shaft 14 are disengaged. The first brake mechanism 112 (the first synchronizer) controls the first gear ring 1111 to be locked (the first synchronizer is connected to the housing 15), and the second brake mechanism 122 (the second synchronizer) controls the second gear ring 1211 to be locked (the second synchronizer is connected to the housing 15). After first-stage deceleration, torque of the motors on both sides is output by using a planet carrier, and the torque of the left and right wheels may be independently adjusted to implement a good steering characteristic. When the vehicle turns, the vehicle may be in a neutral steering range. For a case in which the vehicle has a large torque requirement in a working condition like an icy or waterlogged road, and output torque of the left and right wheels may be different, vehicle passability may be improved by controlling the output torque of the left and right wheels. Therefore, the vehicle is applicable to the working condition like the icy or waterlogged road.

Figure 7:
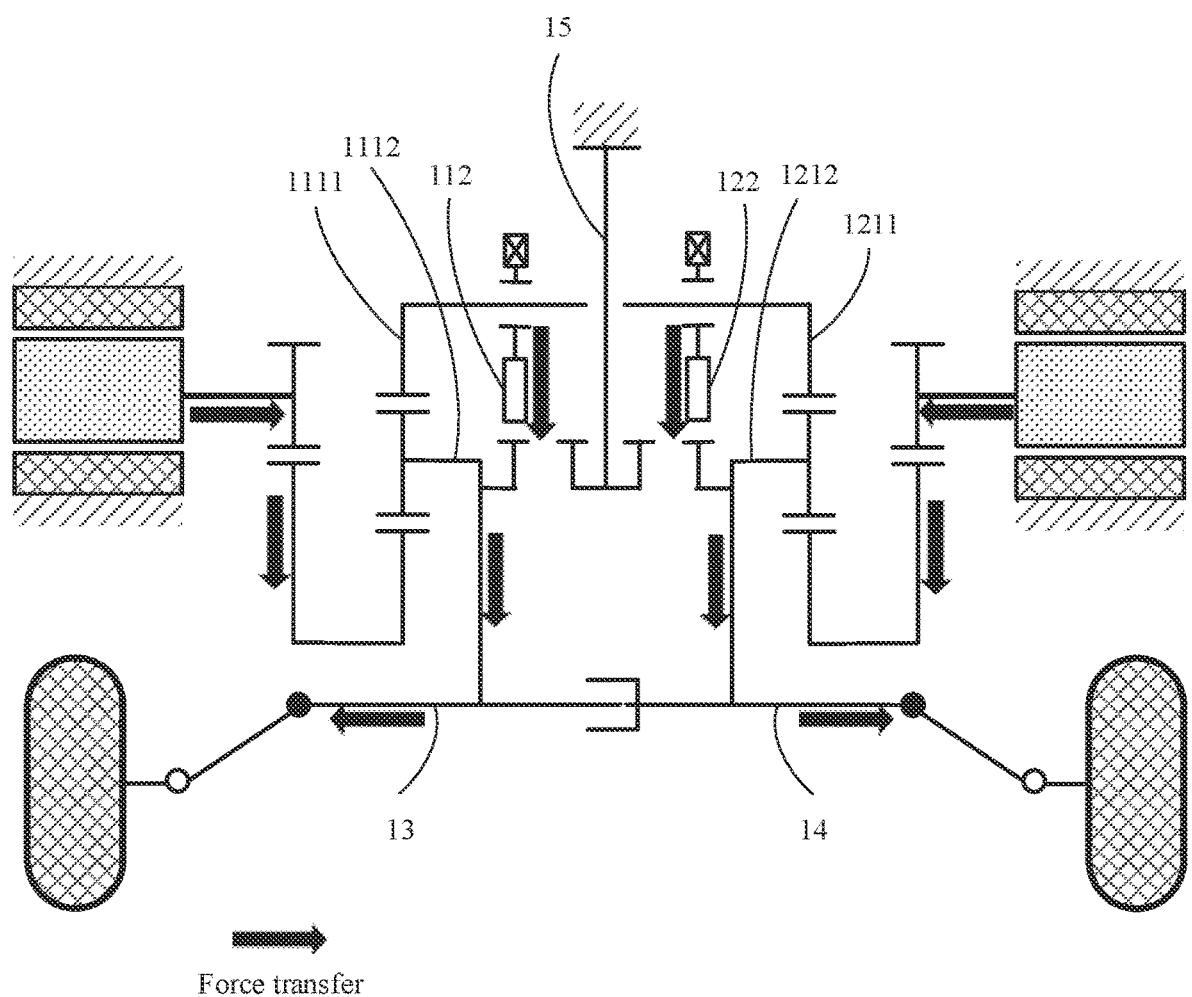
FIG. 7 is a schematic diagram of a principle of a second drive mode according to an embodiment of this application.

The drive mode 2 is a second-gear dual-motor distributed drive mode. FIG. 7 is a schematic diagram of a principle of a second drive mode according to an embodiment of this application. The first output half shaft 13 and the second output half shaft 14 are disengaged. The first brake mechanism 112 (the first synchronizer) controls the first gear ring 1111 to be connected to the first planet carrier 1112, and the second brake mechanism 122 (the second synchronizer) controls the second gear ring 1211 to be connected to the second planet carrier 1212. The first planetary gear system 11 and the second planetary gear system 121 are in a direct gear state. When the vehicle runs at a high speed, economy performance can be improved, so that a drive motor is ensured to better work in an economic range. In addition, torque of the left and right wheels can be adjusted in real time to implement a better steering characteristic.

Figure 8:
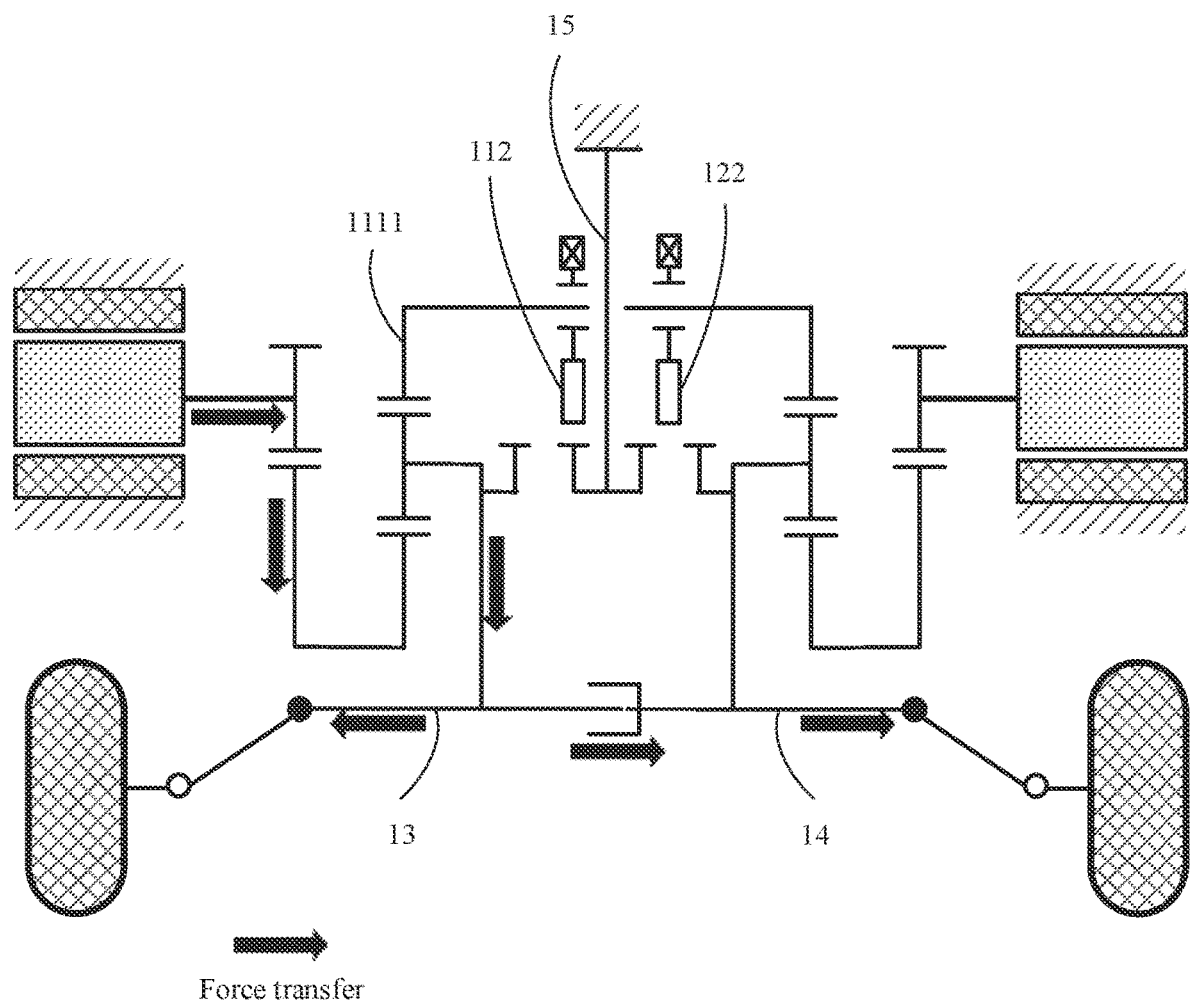
FIG. 8 is a schematic diagram of a principle of a third drive mode according to an embodiment of this application.

The drive mode 3 is a first-gear first motor centralized drive mode. FIG. 8 is a schematic diagram of a principle of a third drive mode according to an embodiment of this application. The first output half shaft 13 and the second output half shaft 14 are engaged. The first brake mechanism 112 (the first synchronizer) controls the first gear ring 1111 to be locked (the first synchronizer is connected to the housing 15), and the second brake mechanism 122 (the second synchronizer) is located in a neutral gear state, so as to disconnect a power output source of the second motor. In a driving process of the vehicle, when the first motor needs to independently drive the left and right wheels in a centralized manner, for example, the second motor or the second brake mechanism suddenly fails, the first motor independently drives the left and right wheels in a centralized manner.

Figure 9:
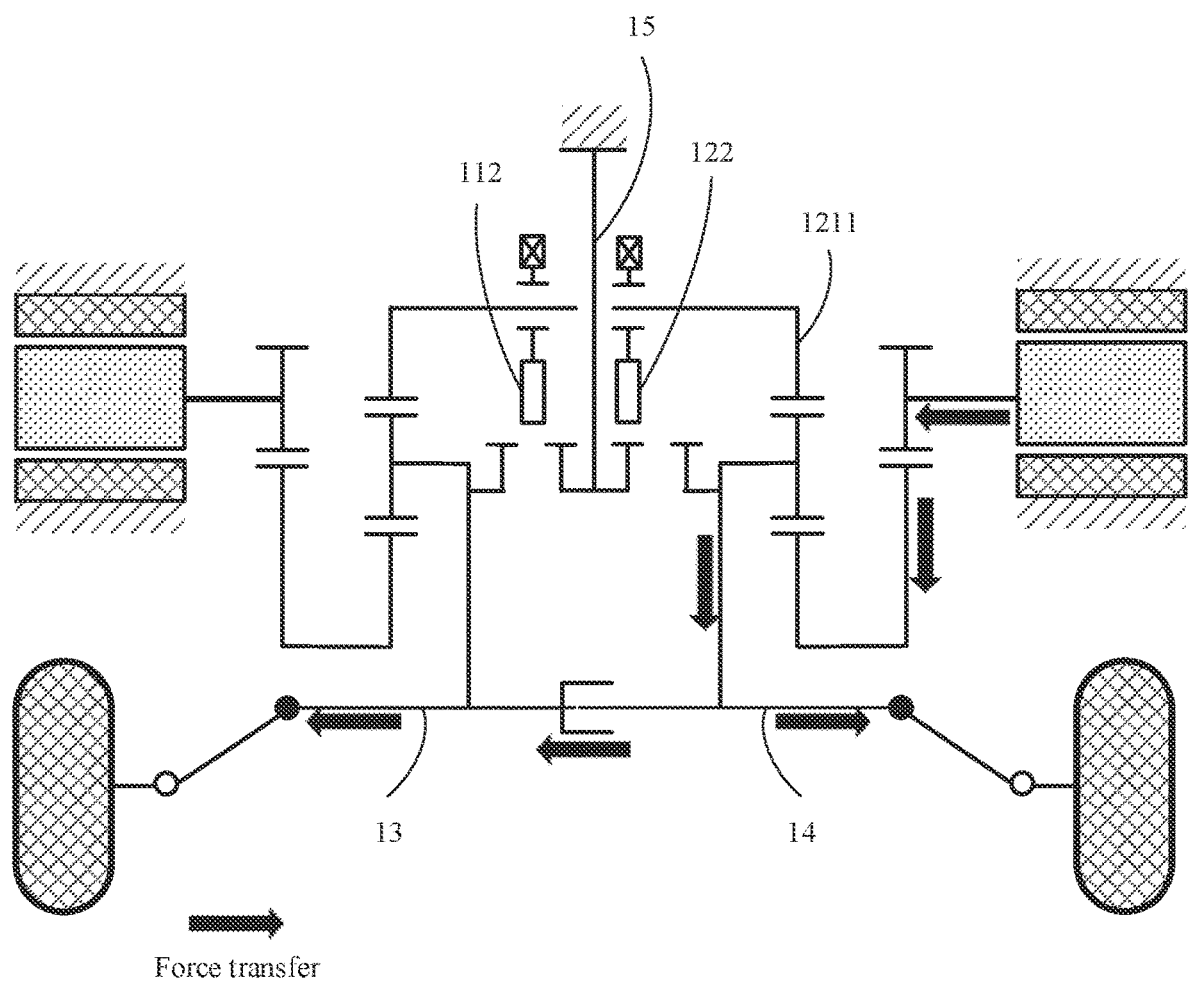
FIG. 9 is a schematic diagram of a principle of a fourth drive mode according to an embodiment of this application.

The drive mode 4 is a first-gear second motor centralized drive mode. FIG. 9 is a schematic diagram of a principle of a fourth drive mode according to an embodiment of this application. The first output half shaft 13 and the second output half shaft 14 are engaged. The second brake mechanism 122 (the second synchronizer) controls the second gear ring 1211 to be locked (the second synchronizer is connected to the housing 15). The first brake mechanism 112 (the first synchronizer) is located in a neutral gear state, so as to disconnect a power output source of the first motor. In a driving process of the vehicle, when the second motor needs to independently drive the left and right wheels in a centralized manner, for example, the first motor or the first brake mechanism suddenly fails, the second motor independently drives the left and right wheels in a centralized manner.

Figure 10:
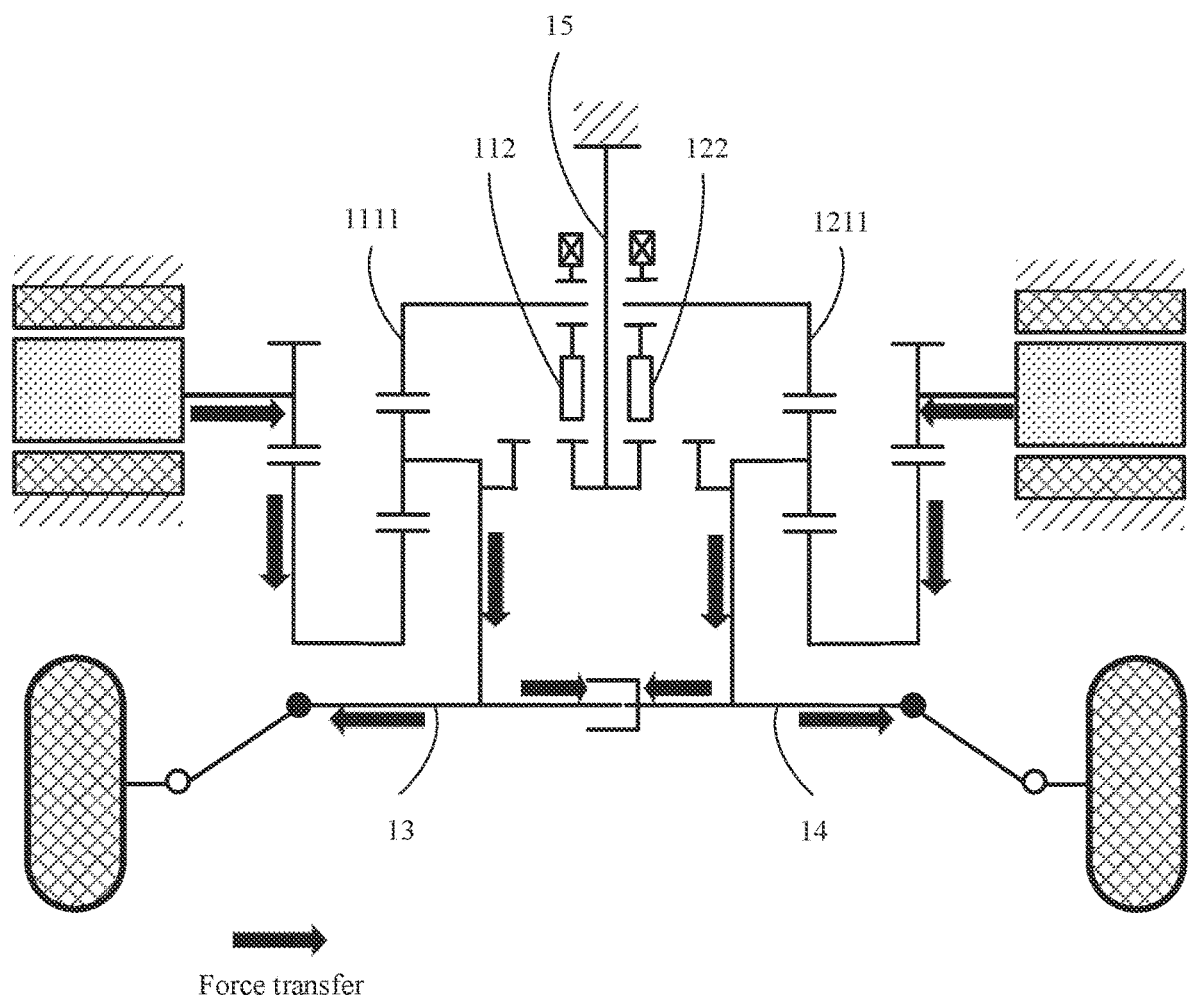
FIG. 10 is a schematic diagram of a principle of a fifth drive mode according to an embodiment of this application.

The drive mode 5 is a first-gear dual-motor centralized drive mode. FIG. 10 is a schematic diagram of a principle of a fifth drive mode according to an embodiment of this application. The first output half shaft 13 and the second output half shaft 14 are engaged. The first brake mechanism 112 (the first synchronizer) controls the first gear ring 1111 to be locked (the first synchronizer is connected to the housing 15), and the second brake mechanism 122 (the second synchronizer) controls the second gear ring 1211 to be locked (the second synchronizer is connected to the housing 15), so that power of the two motors is superimposed and then output to a drive wheel. This resolves a problem that when an attachment coefficient of a road surface is low, a single motor usually cannot meet a drive torque requirement. Further, collaborative drive of the two motors working in the first gear can ensure output torque when a vehicle speed is low.

Figure 11:
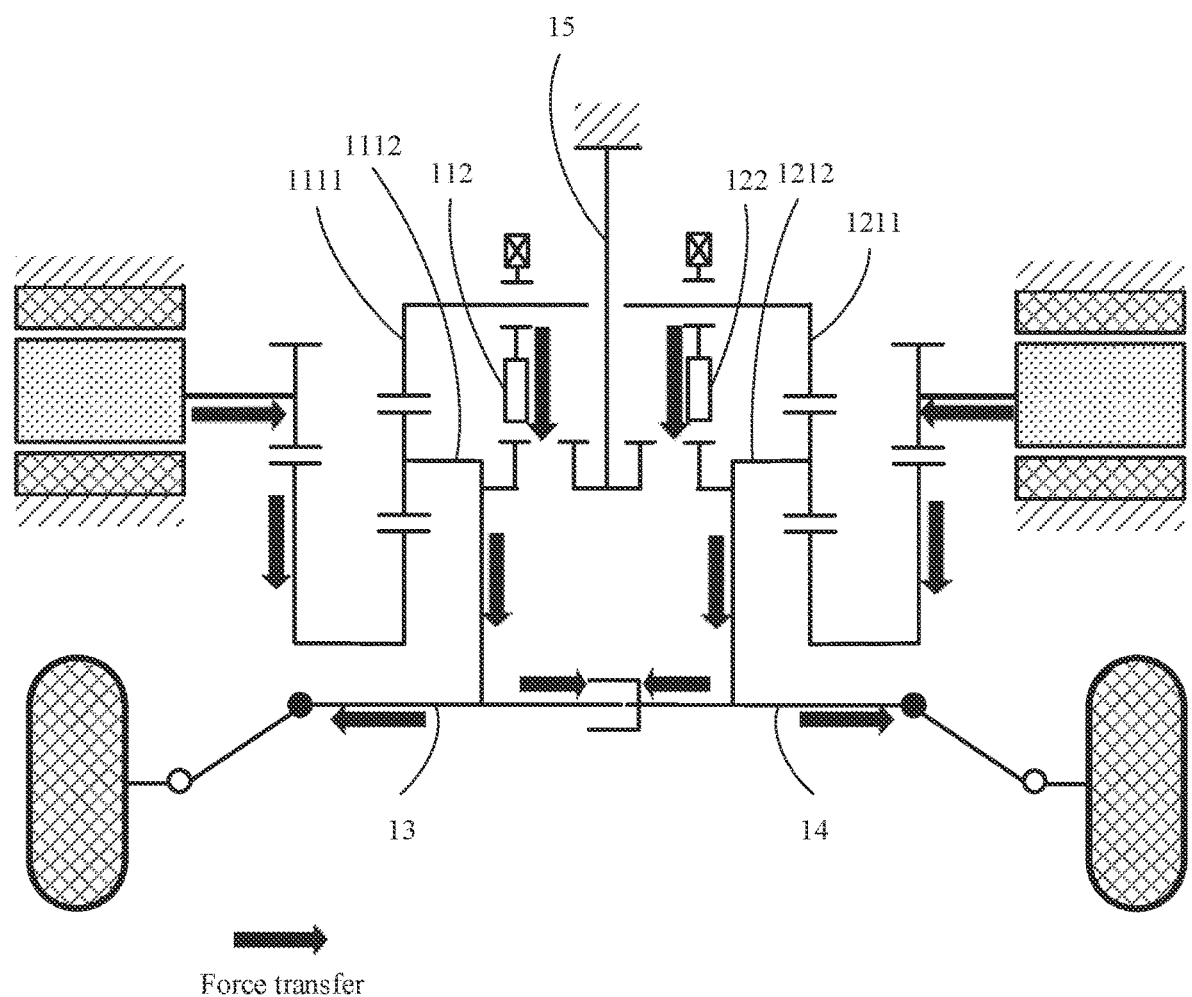
FIG. 11 is a schematic diagram of a principle of a sixth drive mode according to an embodiment of this application.

The drive mode 6 is a second-gear dual-motor centralized drive mode. FIG. 11 is a schematic diagram of a principle of a sixth drive mode according to an embodiment of this application. The first output half shaft 13 and the second output half shaft 14 are engaged, the first brake mechanism 112 (the first synchronizer) controls the first gear ring 1111 to be connected to the first planet carrier 1112, and the second brake mechanism 122 (the second synchronizer) controls the second gear ring 1211 to be connected to the second planet carrier 1212, so that power of the two motors is superimposed and then output to a drive wheel. This resolves a problem that when an attachment coefficient of a road surface is low, a single motor usually cannot meet a drive torque requirement. Further, collaborative drive of the two motors working in the second gear can ensure output torque when a vehicle speed is high. In addition, a rotation speed of the motor can well match the vehicle speed.

Figure 12:
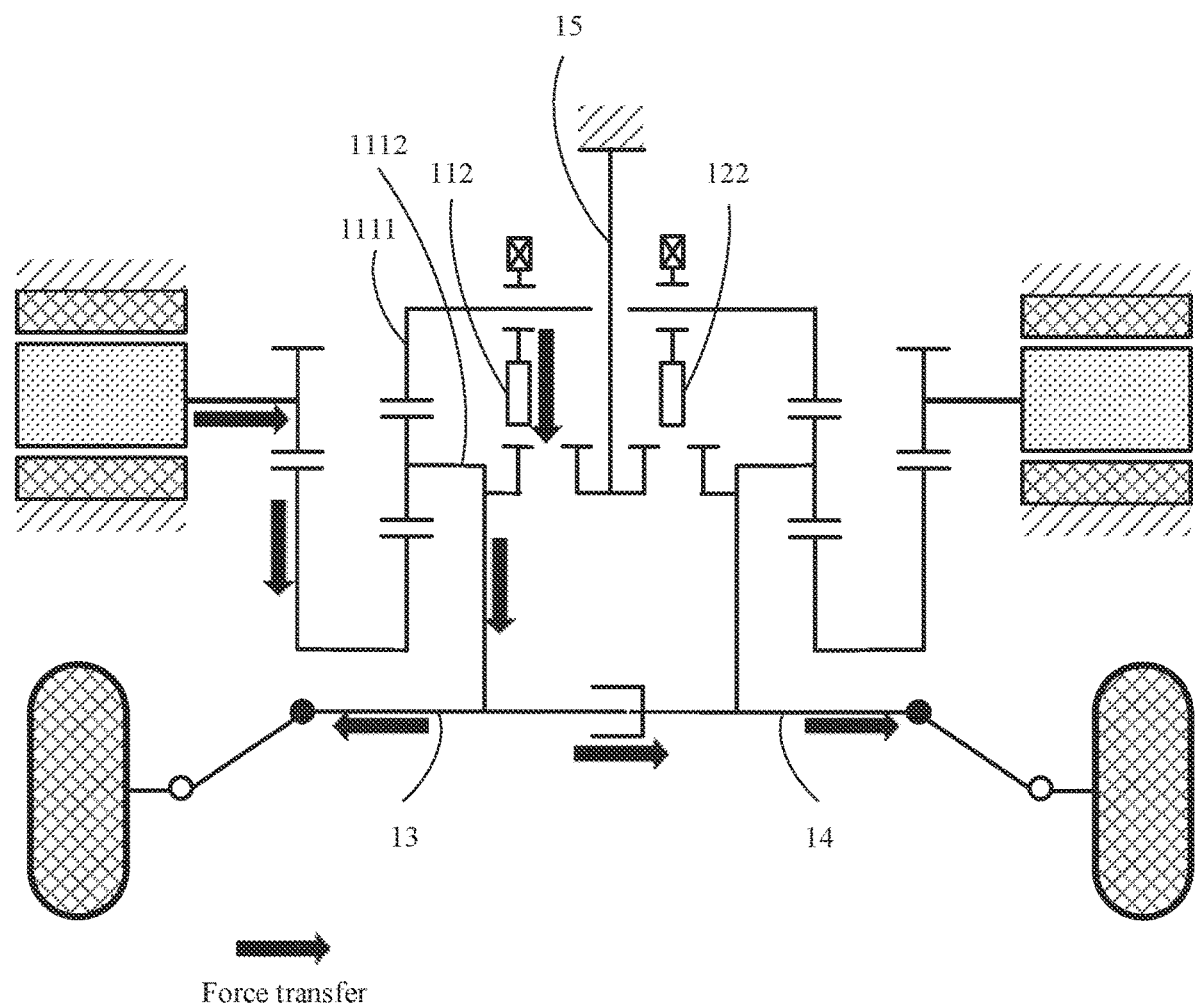
FIG. 12 is a schematic diagram of a principle of a seventh drive mode according to an embodiment of this application.

The drive mode 7 is a second-gear first motor centralized drive mode. FIG. 12 is a schematic diagram of a principle of a seventh drive mode according to an embodiment of this application. The first output half shaft 13 and the second output half shaft 14 are engaged. The first brake mechanism 112 (the first synchronizer) controls the first gear ring 1111 to be connected to the first planet carrier 1112, and the second brake mechanism 122 (the second synchronizer) is located in a neutral gear state, so as to disconnect a power output source of the second motor. In a driving process of the vehicle, when the first motor needs to independently drive the left and right wheels in a centralized manner, for example, the second motor or the second brake mechanism suddenly fails, the first motor can independently drive the left and right wheels in a centralized manner, to match a high vehicle speed.

Figure 13:
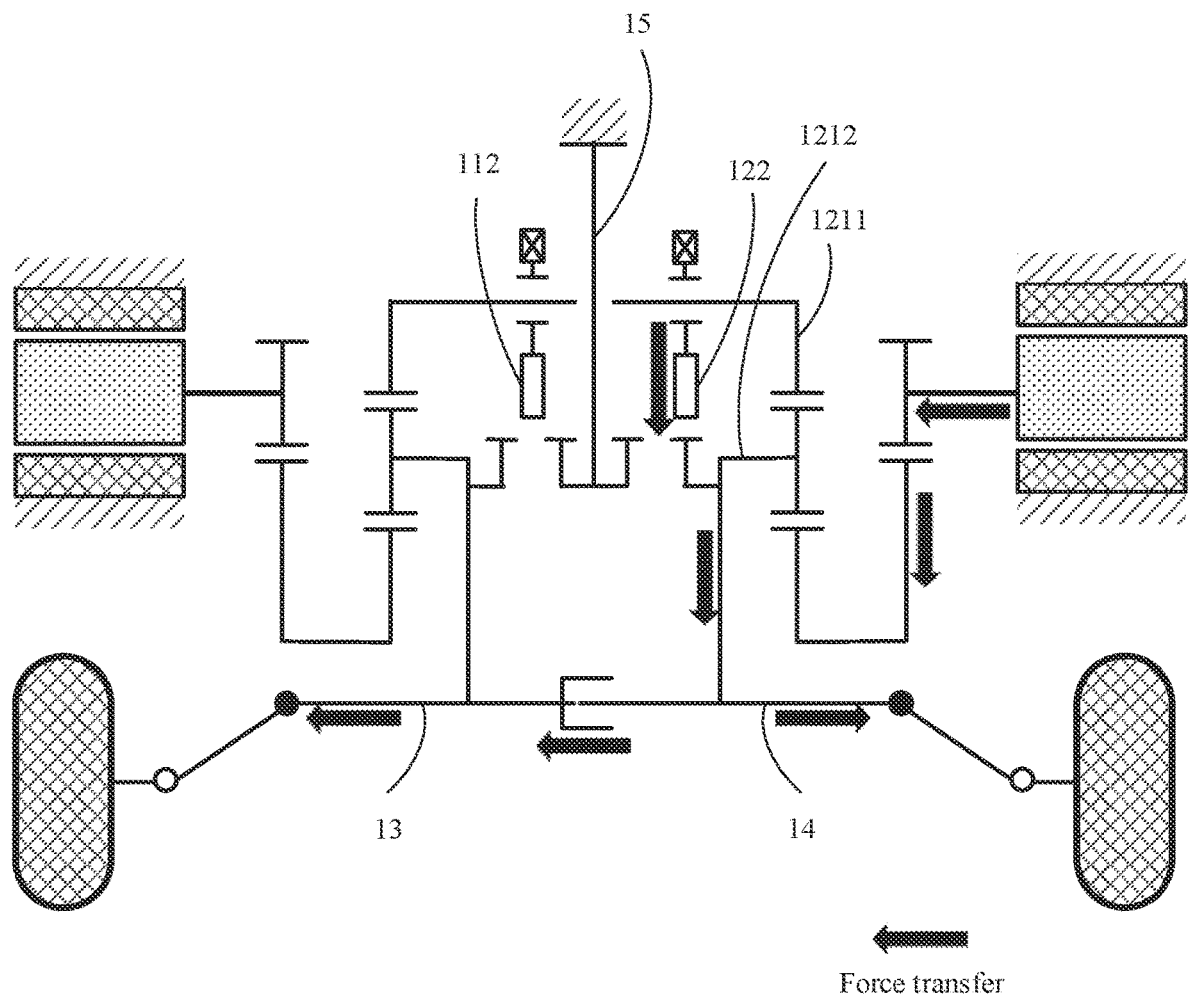
FIG. 13 is a schematic diagram of a principle of an eighth drive mode according to an embodiment of this application.

The drive mode 8 is a second-gear second motor centralized drive mode. FIG. 13 is a schematic diagram of a principle of an eighth drive mode according to an embodiment of this application. The first output half shaft 13 and the second output half shaft 14 are engaged. The second brake mechanism 122 (the second synchronizer) controls the second gear ring 1211 to be connected to the second planet carrier 1212. The first brake mechanism 112 (the first synchronizer) is located in a neutral gear state, so as to disconnect a power output source of the first motor. In a driving process of the vehicle, when the second motor needs to independently drive the left and right wheels in a centralized manner, for example, the first motor or the first brake mechanism suddenly fails, the second motor can independently drive the left and right wheels in a centralized manner, to match a high vehicle speed.

The drive apparatus or the dual-motor drive system in this embodiment of this application may implement eight drive modes, such as a single-motor centralized two-gear variable speed drive mode, a dual-motor centralized two-gear drive mode, and a dual-motor distributed two-gear variable speed drive mode. First-gear drive may be used when the vehicle starts and accelerates, second-gear drive may be used during high-speed cruise, centralized drive is used on an urban road, dual-motor drive is used in a mountainous and extreme working condition, and a redundant drive structure may be used when a single motor is faulty. In addition, the vehicle can be flexibly switched according to a driver's requirement and a driving condition, so that torque vector control of the left and right wheels can be implemented, and a differential assembly of a conventional transmission can be omitted. The vehicle has excellent power, economy performance, maneuverability, passability, and off-road performance on the premise that a size of a power assembly is reduced. In addition, the dual-motor drive system can be flexibly configured for a front-drive, rear-drive, or four-drive vehicle model, to further improve vehicle power and economy performance.

Figure 14:
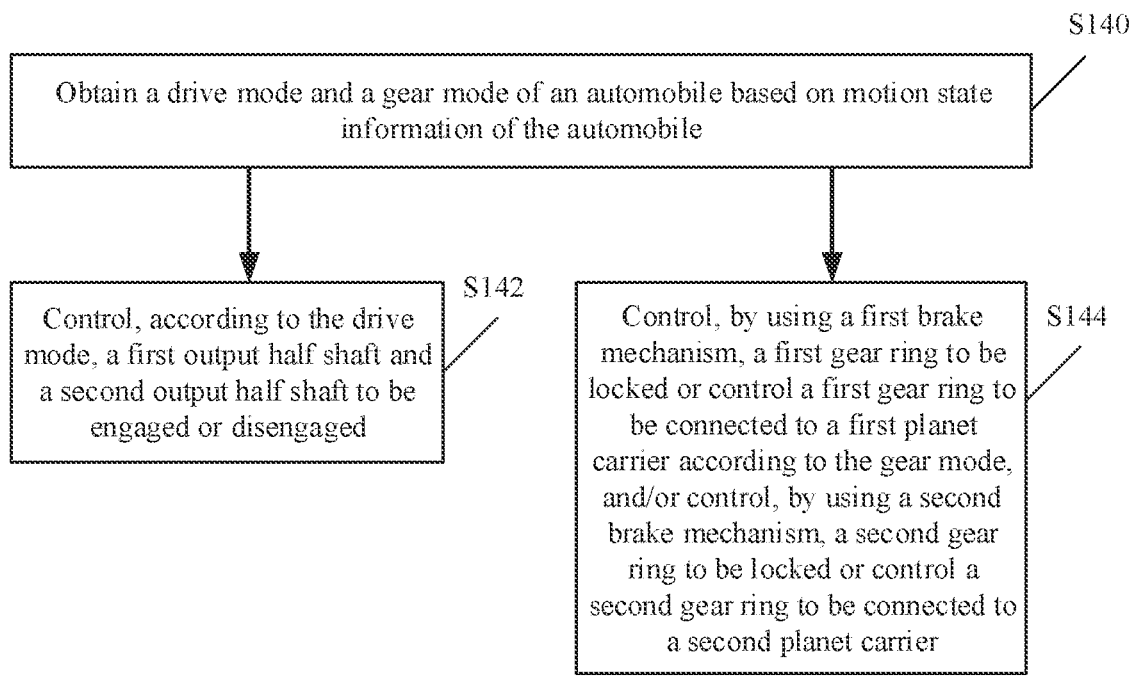
FIG. 14 is a schematic flowchart of a control method for a drive apparatus according to an embodiment of this application.

With reference to a schematic flowchart of a control method for a drive apparatus according to an embodiment of this application shown in FIG. 14, the following describes how to control the drive apparatus in this application. The method may include the following steps.

Step S140: Obtain a drive mode and a gear mode of an automobile based on motion state information of the automobile.

Specifically, a processor (for example, an in-vehicle processor) may collect and monitor the motion state information of the automobile by using one or more sensors of the automobile, to obtain the motion state information of the automobile. Then, the processor may determine and obtain, based on the obtained the motion state information of the automobile, the drive mode and the gear mode of the automobile based on a preset drive mode determining algorithm, a gear mode determining algorithm, and the like.

For example, if a distributed drive mode and a first-gear dual-motor drive mode are determined and obtained, the drive mode 1 in Table 1 is determined. For another example, if a centralized drive mode and a second-gear second motor drive mode are determined and obtained, the drive mode 8 in Table 1 is determined.

Step S142: Control, according to the drive mode, a first output half shaft and a second output half shaft to be engaged or disengaged.

Step S144: Control, by using a first brake mechanism, a first gear ring to be locked or control a first gear ring to be connected to a first planet carrier according to the gear mode, and/or control, by using a second brake mechanism, a second gear ring to be locked or control a second gear ring to be connected to a second planet carrier.

Specifically, step S142 and step S144 are not performed in a specific sequence, or may be performed simultaneously. This is not limited in this embodiment of this application.

In a possible implementation, when the drive mode obtained by the processor is the distributed drive mode, and the gear mode is a first-gear drive mode, Step S142 may specifically include: controlling the first output half shaft and the second output half shaft to be disengaged.

Step S142 may specifically include: controlling, by using the first brake mechanism, the first gear ring to be locked, and controlling, by using the second brake mechanism, the second gear ring to be locked.

Figure 15:
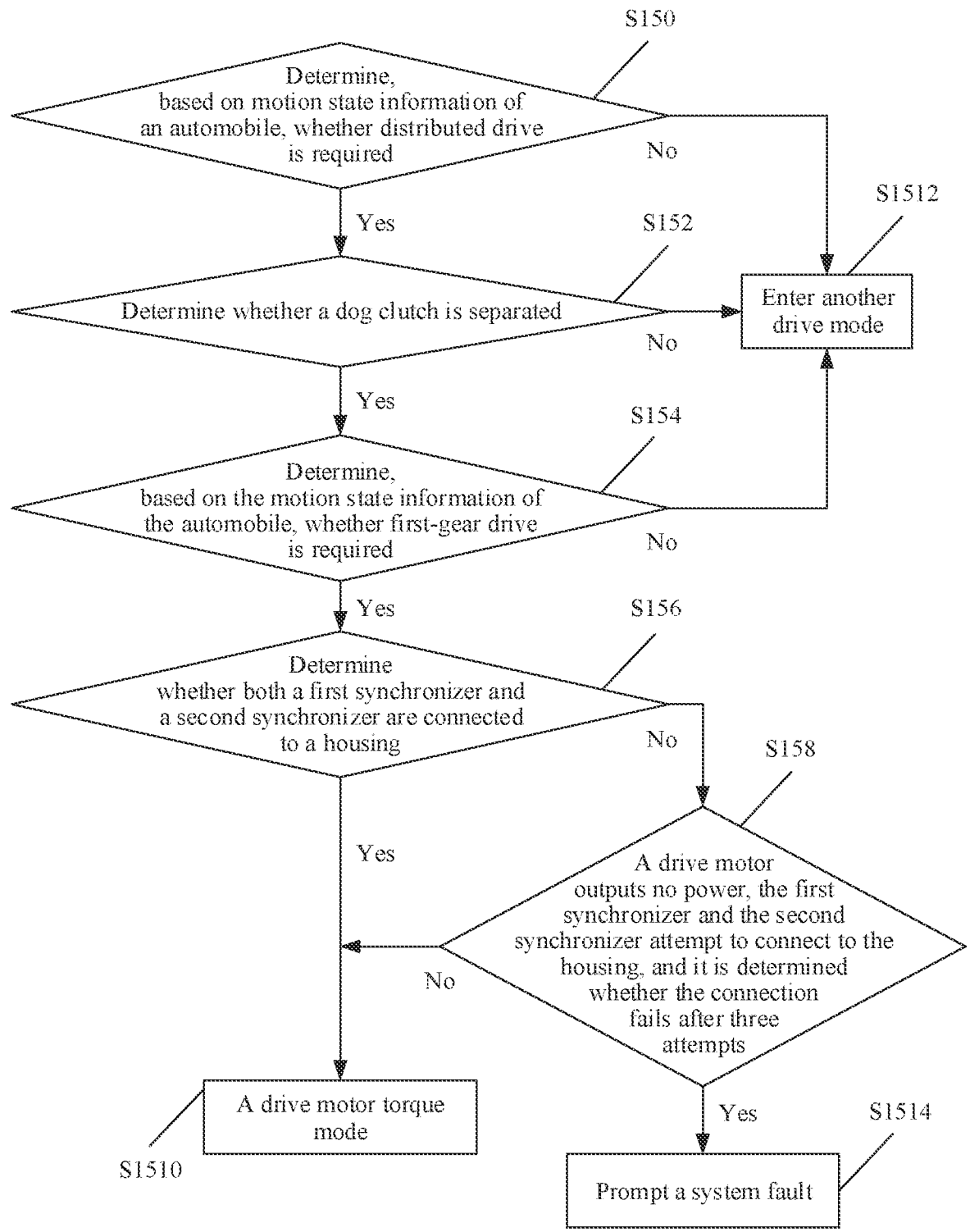
FIG. 15 is a schematic flowchart of a first control method for a drive apparatus according to an embodiment of this application.

For example, a dog clutch, the first brake mechanism, and the second brake mechanism are respectively a first synchronizer and a second synchronizer, and the synchronizer is combined with a housing of the drive apparatus, so that a vehicle is at a first-gear position. With reference to a schematic flowchart of a first control method for a drive apparatus according to an embodiment of this application shown in FIG. 15, how to determine and control a first-gear dual-motor distributed drive mode may be described. The following steps may be included.

Step S150: Determine, based on motion state information of an automobile, whether distributed drive is required.

Specifically, when it is determined that the distributed drive is required, step S152 is performed; and when it is determined that the distributed drive is not required, step S1512 is performed.

Step S152: Determine whether a dog clutch is separated.

Specifically, when it is determined that the dog clutch is separated, step S154 is performed; and when it is determined that the dog clutch is not separated, step S1512 is performed.

Step S154: Determine, based on the motion state information of the automobile, whether first-gear drive is required.

Specifically, when it is determined that first-gear drive is required, step S156 is performed; and when it is determined that first-gear drive is not required, step S1512 is performed.

Step S156: Determine whether both a first synchronizer and a second synchronizer are connected to a housing.

Specifically, when it is determined that the first synchronizer and the second synchronizer are connected to the housing, step S1510 is performed; and when it is determined that the first synchronizer and the second synchronizer are connected to the housing, step S158 is performed.

Step S158: A drive motor outputs no power, the first synchronizer and the second synchronizer attempt to connect to the housing, and it is determined whether the connection fails after three attempts.

Specifically, if the attempt fails after three times, step S1514 is performed; and if the attempt succeeds after three times, step S1510 is performed.

Step S1510: A drive motor torque mode.

Specifically, with reference to FIG. 6, the processor determines and implements a first-gear dual-motor distributed drive mode.

Step S1512: Enter another drive mode.

Step S1514: Prompt a system fault.

In a possible implementation, when the drive mode is the distributed drive mode, and the gear mode is a second-gear drive mode, Step S142 may specifically include: controlling the first output half shaft and the second output half shaft to be disengaged;

Step S144 may specifically include: controlling, by using a first brake mechanism, a first gear ring to be connected to a first planet carrier, and controlling, by using a second brake mechanism, a second gear ring to be connected to a second planet carrier.

Figure 16:
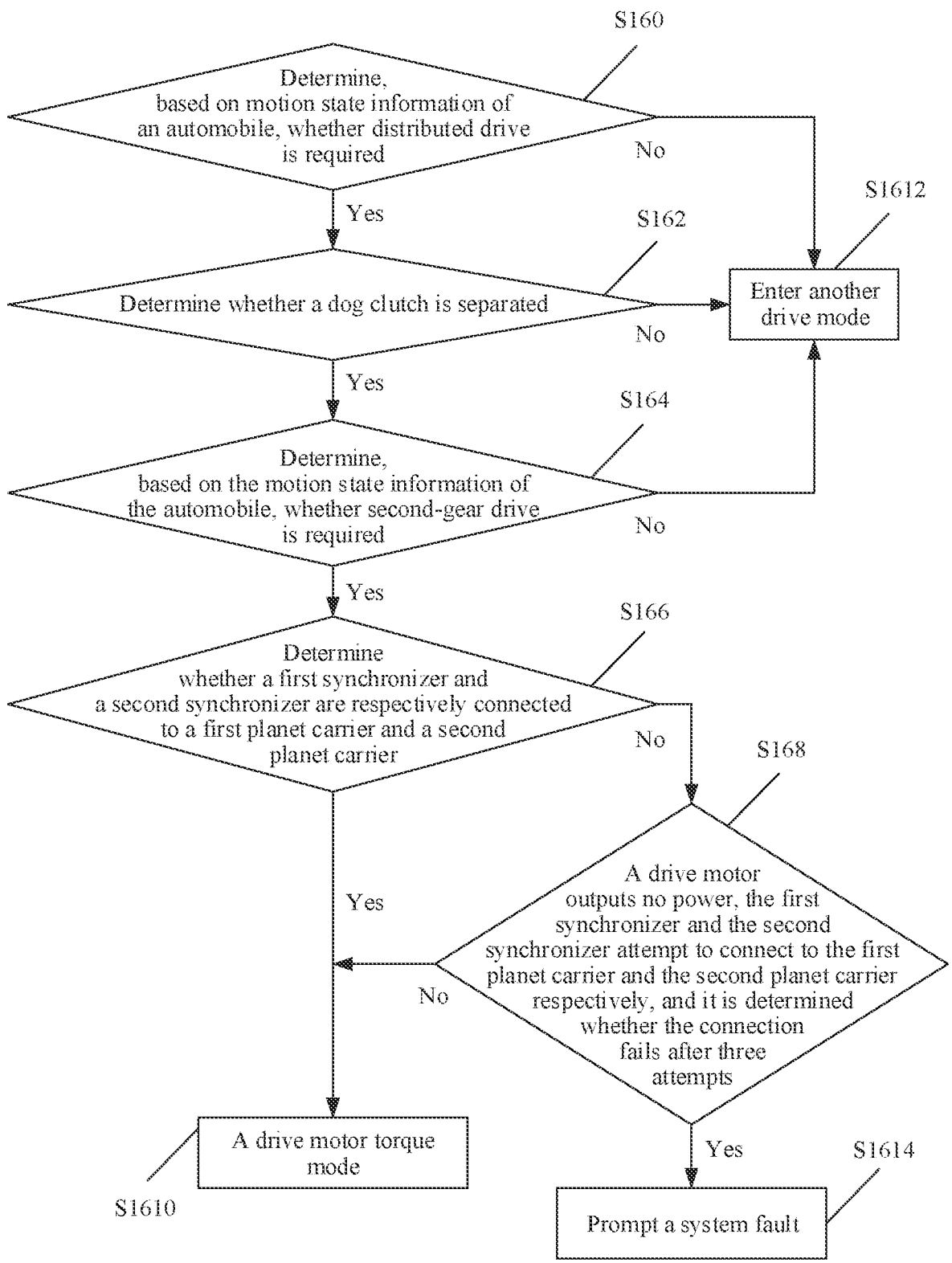
FIG. 16 is a schematic flowchart of a second control method for a drive apparatus according to an embodiment of this application.

For example, the dog clutch, the first brake mechanism, and the second brake mechanism are respectively a first synchronizer and a second synchronizer, and the synchronizer is combined with a housing of the drive apparatus, so that a vehicle is at a first-gear position. With reference to a schematic flowchart of a second control method for a drive apparatus according to an embodiment of this application shown in FIG. 16, how to determine and control a second-gear dual-motor distributed drive mode may be described. The following steps may be included.

Step S160: Determine, based on motion state information of an automobile, whether distributed drive is required.

Specifically, when it is determined that the distributed drive is required, step S162 is performed; and when it is determined that the distributed drive is not required, step S1612 is performed.

Step S162: Determine whether a dog clutch is separated.

Specifically, when it is determined that the dog clutch is separated, step S164 is performed; and when it is determined that the dog clutch is not separated, step S1612 is performed.

Step S164: Determine, based on the motion state information of the automobile, whether second-gear drive is required.

Specifically, when it is determined that second-gear drive is required, step S166 is performed; and when it is determined that second-gear drive is not required, step S1612 is performed.

Step S166: Determine whether a first synchronizer and a second synchronizer are respectively connected to a first planet carrier and a second planet carrier.

Specifically, when it is determined that the first synchronizer and the second synchronizer are connected to the housing, step S1610 is performed; and when it is determined that the first synchronizer and the second synchronizer are connected to the housing, step S168 is performed.

Step S168: A drive motor outputs no power, the first synchronizer and the second synchronizer attempt to connect to the first planet carrier and the second planet carrier respectively, and it is determined whether the connection fails after three attempts.

Specifically, if the attempt fails after three times, step S1614 is performed; and if the attempt succeeds after three times, step S1610 is performed.

Step S1610: A drive motor torque mode.

Specifically, with reference to FIG. 7, the processor determines and implements a second-gear dual-motor distributed drive mode.

Step S1612: Enter another drive mode.

Step S1614: Prompt a system fault.

In a possible implementation, when the drive mode is a centralized drive mode, and the gear mode is the first-gear drive mode, Step S142 may specifically include: controlling the first output half shaft and the second output half shaft to be engaged;

Step S142 may specifically include: controlling, by using a first brake mechanism, a first gear ring to be locked, where the second brake mechanism is located in a neutral gear; or controlling, by using the second brake mechanism, the second gear ring to be locked, where the first brake mechanism is located in a neutral gear, or controlling, by using the first brake mechanism, the first gear ring to be locked, and controlling, by using the second brake mechanism, the second gear ring to be locked.

Figure 17A:
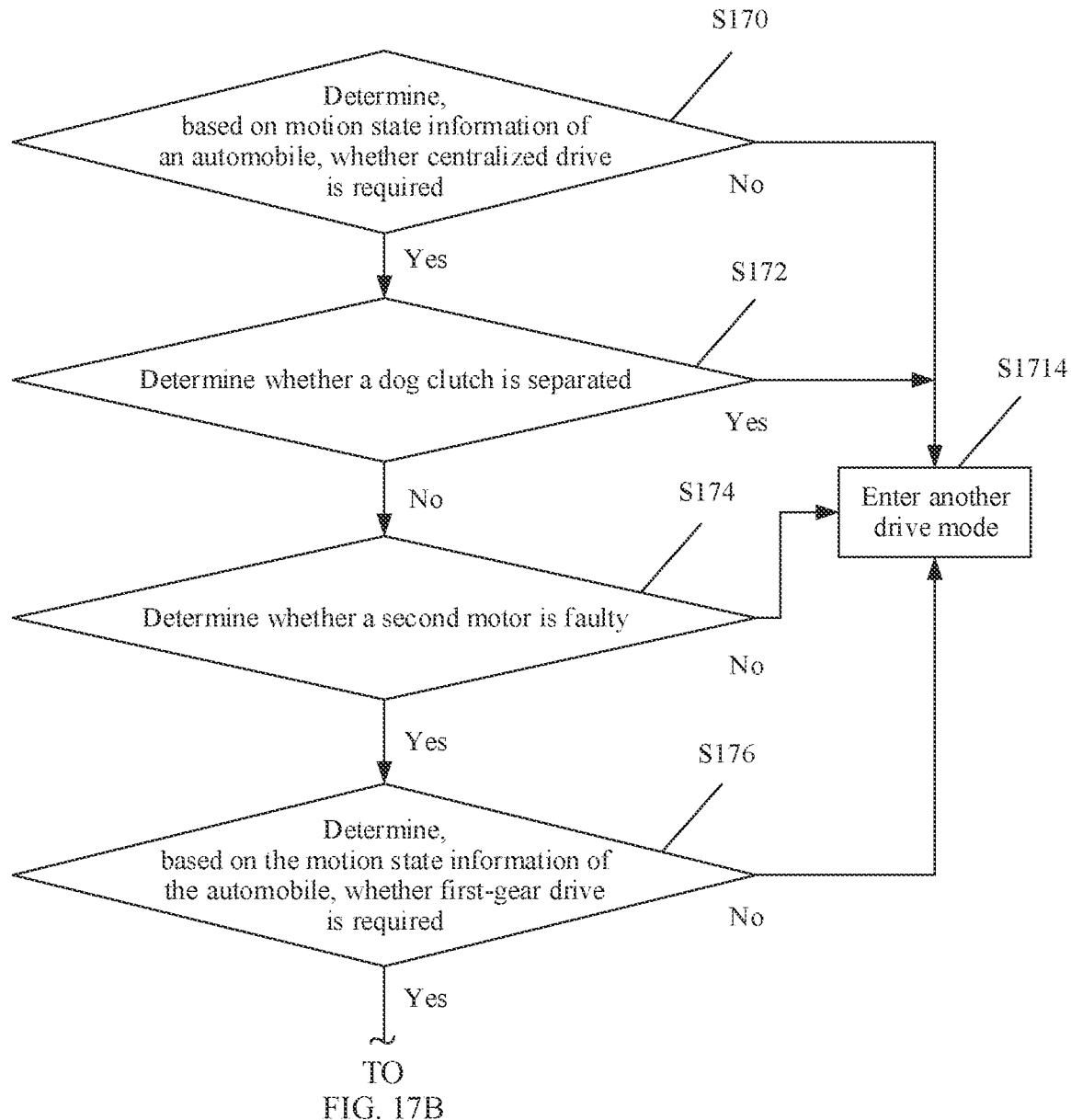
FIG. 17A and FIG. 17B are a schematic flowchart of a third control method for a drive apparatus according to an embodiment of this application.
Figure 17B:
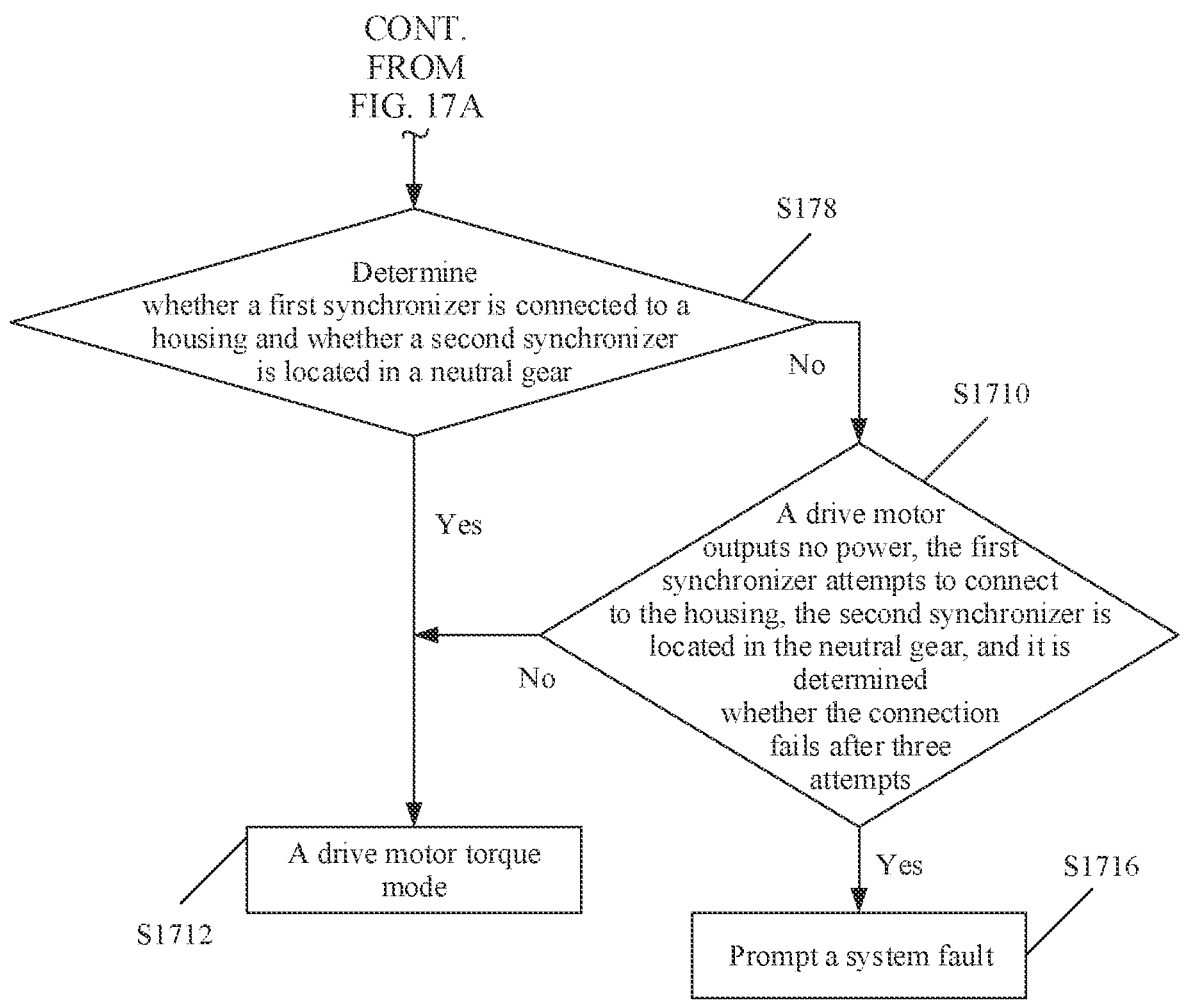

For example, the dog clutch, the first brake mechanism, and the second brake mechanism are respectively a first synchronizer and a second synchronizer, and the synchronizer is combined with a housing of the drive apparatus, so that a vehicle is at a first-gear position. With reference to a schematic flowchart of a third control method for a drive apparatus according to an embodiment of this application shown in FIG. 17A and FIG. 17B, how to determine and control a first-gear first motor centralized drive mode may be described. The following steps may be included.

Step S170: Determine, based on motion state information of an automobile, whether centralized drive is required.

Specifically, when it is determined that the centralized drive is required, step S172 is performed; and when it is determined that the centralized drive is not required, step S1714 is performed.

Step S172: Determine whether a dog clutch is separated.

Specifically, when it is determined that the dog clutch is not separated, step S174 is performed; and when it is determined that the dog clutch is separated, step S1714 is performed.

Step S174: Determine whether a second motor is faulty.

Specifically, when it is determined that a fault occurs, step S176 is performed; and when it is determined that no fault occurs, step S1714 is performed.

Step S174 is not limited to determining whether the second motor is faulty, or may be used to determine a case such as whether a second synchronizer is damaged, provided that a condition for determining whether a first motor needs to be independently driven in a centralized manner is met.

Step S176: Determine, based on the motion state information of the automobile, whether first-gear drive is required.

Specifically, when it is determined that first-gear drive is required, step S178 is performed; and when it is determined that first-gear drive is not required, step S1714 is performed.

Step S178: Determine whether a first synchronizer is connected to a housing and whether the second synchronizer is located in a neutral gear.

Specifically, when it is determined the first synchronizer is connected to the housing, step S1712 is performed; and when it is determined the first synchronizer is not connected to the housing, step S1710 is performed.

Step S1710: A drive motor outputs no power, the first synchronizer attempts to connect to the housing, the second synchronizer is in the neutral gear, and it is determined whether the connection fails after three attempts.

Specifically, if the attempt fails after three times, step S1716 is performed; and if the attempt succeeds after three times, step S1712 is performed.

Step S1712: A drive motor torque mode.

Specifically, with reference to FIG. 8, the processor determines and implements a first-gear first motor centralized drive mode.

Step S1714: Enter another drive mode.

Step S1716: Prompt a system fault.

Figure 18A:
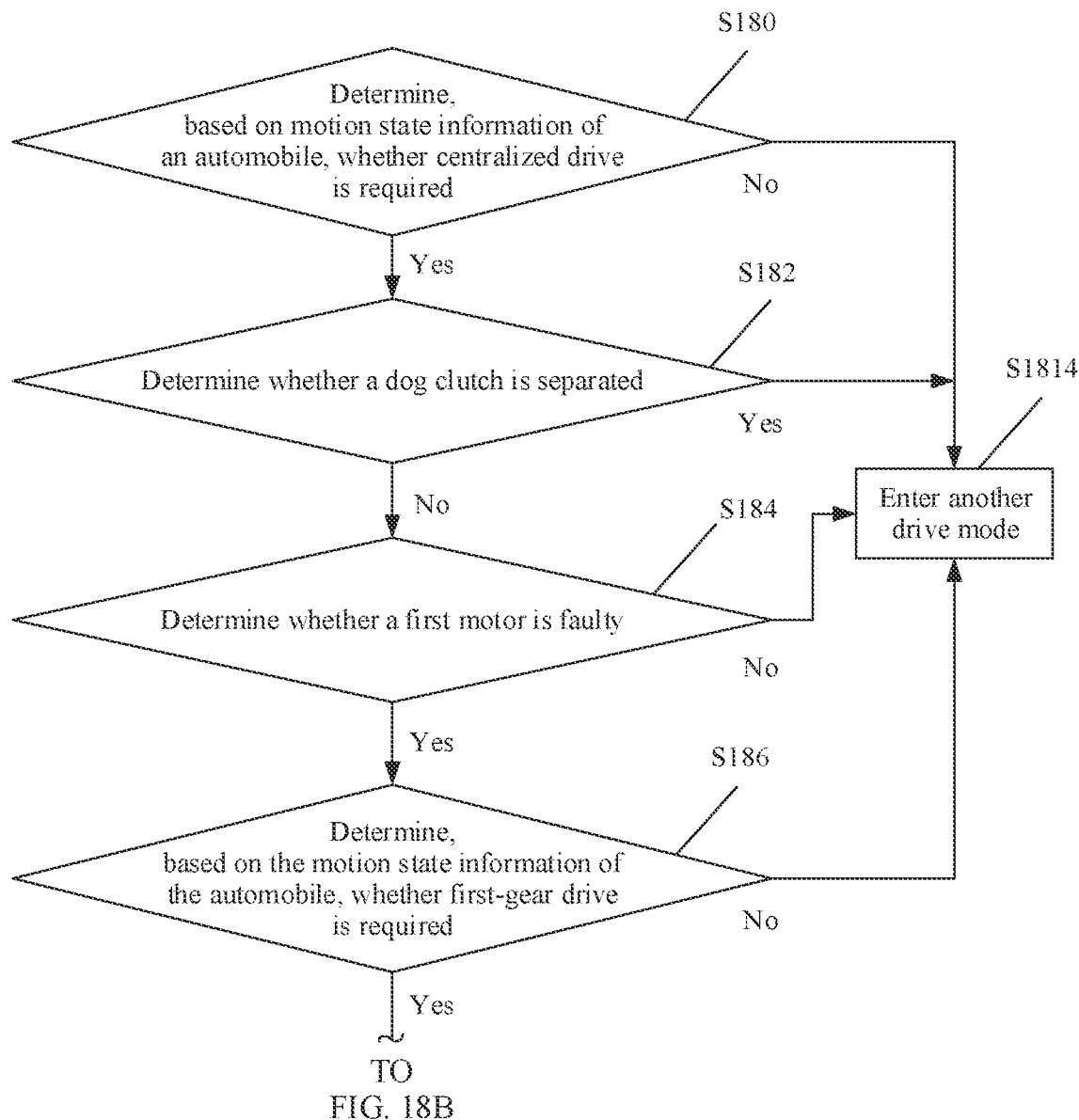
FIG. 18A and FIG. 18B are a schematic flowchart of a fourth control method for a drive apparatus according to an embodiment of this application.
Figure 18B:
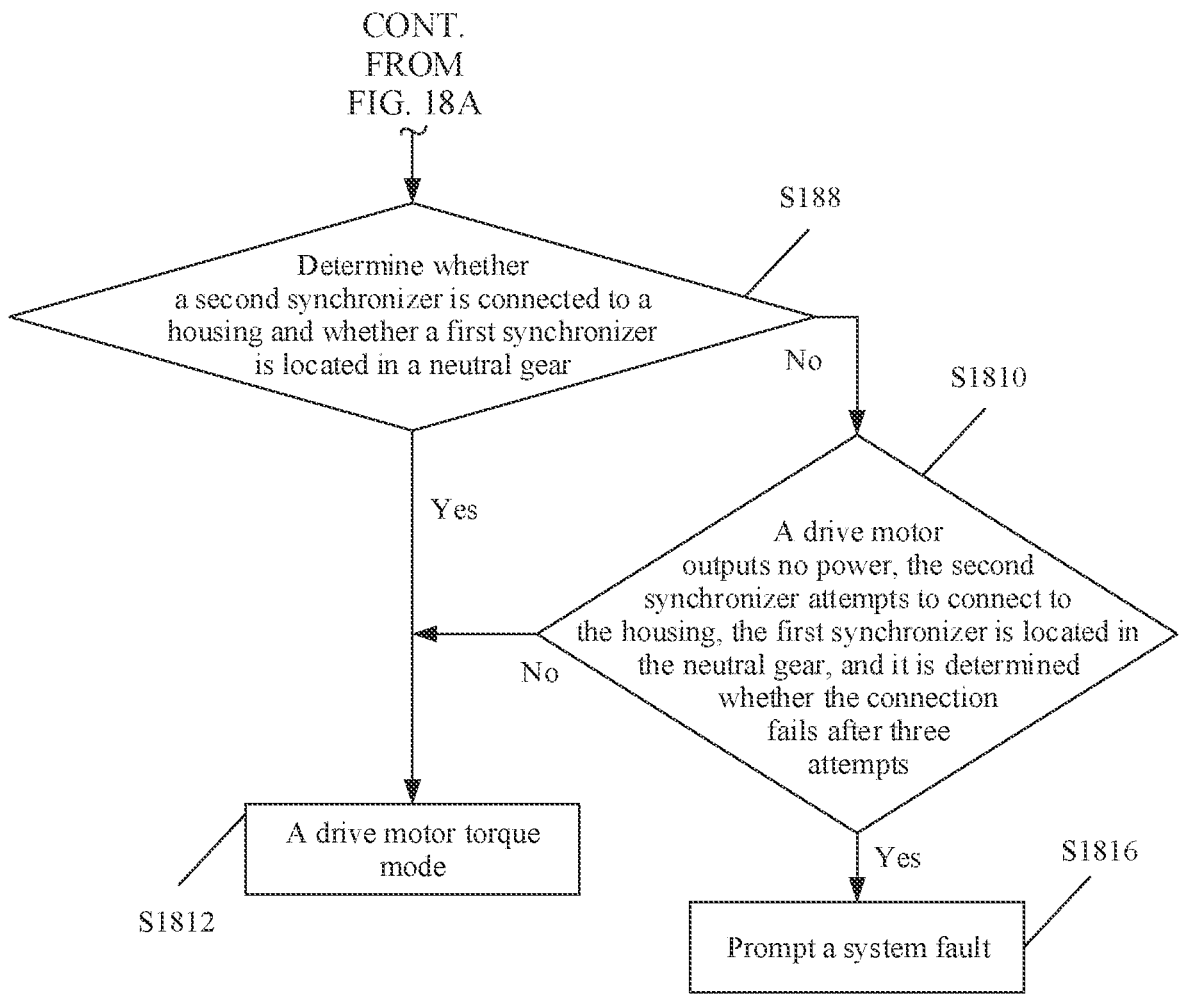

With reference to a schematic flowchart of a fourth control method for a drive apparatus according to an embodiment of this application shown in FIG. 18A and FIG. 18B, how to determine and control a first-gear second motor centralized drive mode may be described. The following steps may be included.

Step S180: Determine, based on motion state information of an automobile, whether centralized drive is required.

Specifically, when it is determined that the centralized drive is required, step S182 is performed; and when it is determined that the centralized drive is not required, step S1814 is performed.

Step S182: Determine whether a dog clutch is separated.

Specifically, when it is determined that the dog clutch is separated, step S184 is performed; and when it is determined that the dog clutch is not separated, step S1814 is performed.

Step S184: Determine whether a first motor is faulty.

Specifically, when it is determined that a fault occurs, step S186 is performed; and when it is determined that no fault occurs, step S1814 is performed.

Step S184 is not limited to determining whether the first motor is faulty, or may be used to determine a case such as whether a first synchronizer is damaged, provided that a condition for determining whether a second motor needs to be independently driven in a centralized manner is met.

Step S186: Determine, based on the motion state information of the automobile, whether first-gear drive is required Specifically, when it is determined that first-gear drive is required, step S188 is performed; and when it is determined that first-gear drive is not required, step S1814 is performed.

Step S188: Determine whether a second synchronizer is connected to a housing and whether the first synchronizer is located in a neutral gear.

Specifically, when it is determined the first synchronizer is connected to the housing, step S1812 is performed; and when it is determined the first synchronizer is not connected to the housing, step S1810 is performed.

Step S1810: A drive motor outputs no power, the second synchronizer attempts to connect to the housing, the first synchronizer is in the neutral gear, and it is determined whether the connection fails after three attempts.

Specifically, if the attempt fails after three times, step S1816 is performed; and if the attempt succeeds after three times, step S1812 is performed.

Step S1812: A drive motor torque mode.

Specifically, with reference to FIG. 9, the processor determines and implements a first-gear second motor centralized drive mode.

Step S1814: Enter another drive mode.

Step S1816: Prompt a system fault.

Figure 19A:
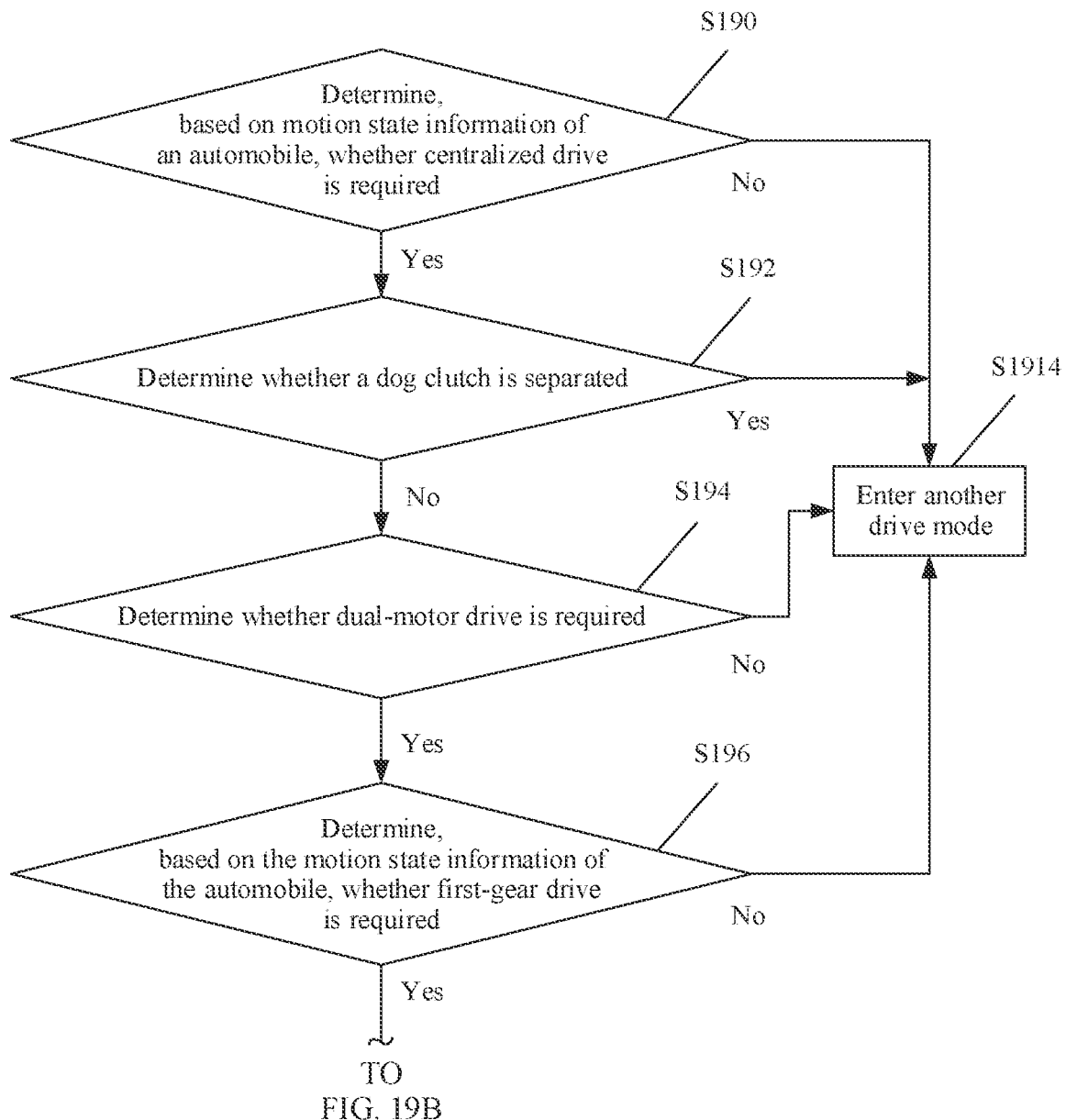
FIG. 19A and FIG. 19B are a schematic flowchart of a fifth control method for a drive apparatus according to an embodiment of this application.
Figure 19B:
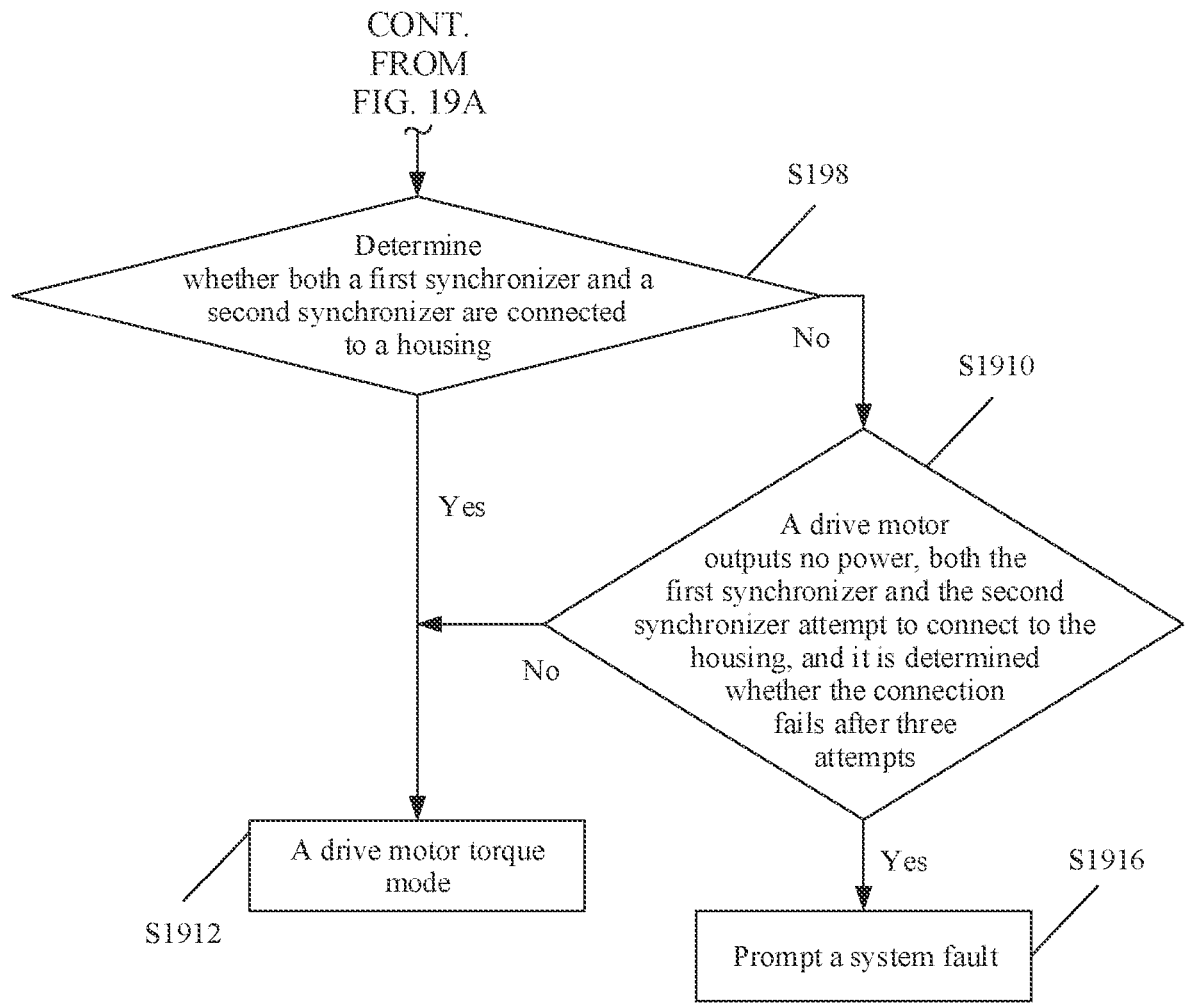

With reference to a schematic flowchart of a fifth control method for a drive apparatus according to an embodiment of this application shown in FIG. 19A and FIG. 19B, how to determine and control a first-gear dual-motor centralized drive mode may be described. The following steps may be included.

Step S190: Determine, based on motion state information of an automobile, whether centralized drive is required.

Specifically, when it is determined that the centralized drive is required, step S192 is performed; and when it is determined that the centralized drive is not required, step S1914 is performed.

Step S192: Determine whether a dog clutch is separated.

Specifically, when it is determined that the dog clutch is not separated, step S194 is performed; and when it is determined that the dog clutch is separated, step S1914 is performed.

Step S194: Determine whether dual-motor drive is required.

Specifically, when it is determined that dual-motor drive is required, step S196 is performed; and when it is determined that dual-motor drive is not required, step S1914 is performed.

Step S196: Determine, based on the motion state information of the automobile, whether first-gear drive is required.

Specifically, when it is determined that first-gear drive is required, step S198 is performed; and when it is determined that first-gear drive is not required, step S1914 is performed.

Step S198: Determine whether both a first synchronizer and a second synchronizer are connected to a housing.

Specifically, when it is determined the first synchronizer and the second synchronizer are connected to the housing, step S1912 is performed; and when it is determined the first synchronizer and the second synchronizer are not connected to the housing, step S1910 is performed.

Step S1910: A drive motor outputs no power, both the first synchronizer and the second synchronizer attempt to connect to the housing, and it is determined whether the connection fails after three attempts.

Specifically, if the attempt fails after three times, step S1916 is performed; and if the attempt succeeds after three times, step S1912 is performed.

Step S1912: A drive motor torque mode.

Specifically, with reference to FIG. 10, the processor determines and implements a first-gear dual-motor centralized drive mode.

Step S1914: Enter another drive mode.

Step S1916: Prompt a system fault.

In a possible implementation, when the obtained drive mode is the centralized drive mode, and the gear mode is the second-gear drive mode, Step S142 may specifically include: controlling the first output half shaft and the second output half shaft to be engaged;

Step S144 may specifically include: controlling, by using the first brake mechanism, the first gear ring to be connected to the first planet carrier, where the second brake mechanism is located in the neutral gear; or controlling, by using the second brake mechanism, the second gear ring to be connected to the second planet carrier, where the first brake mechanism is located in the neutral gear, or controlling, by using the first brake mechanism, the first gear ring to be connected to the first planet carrier, and controlling, by using the second brake mechanism, the second gear ring to be connected to the second planet carrier.

Figure 20A:
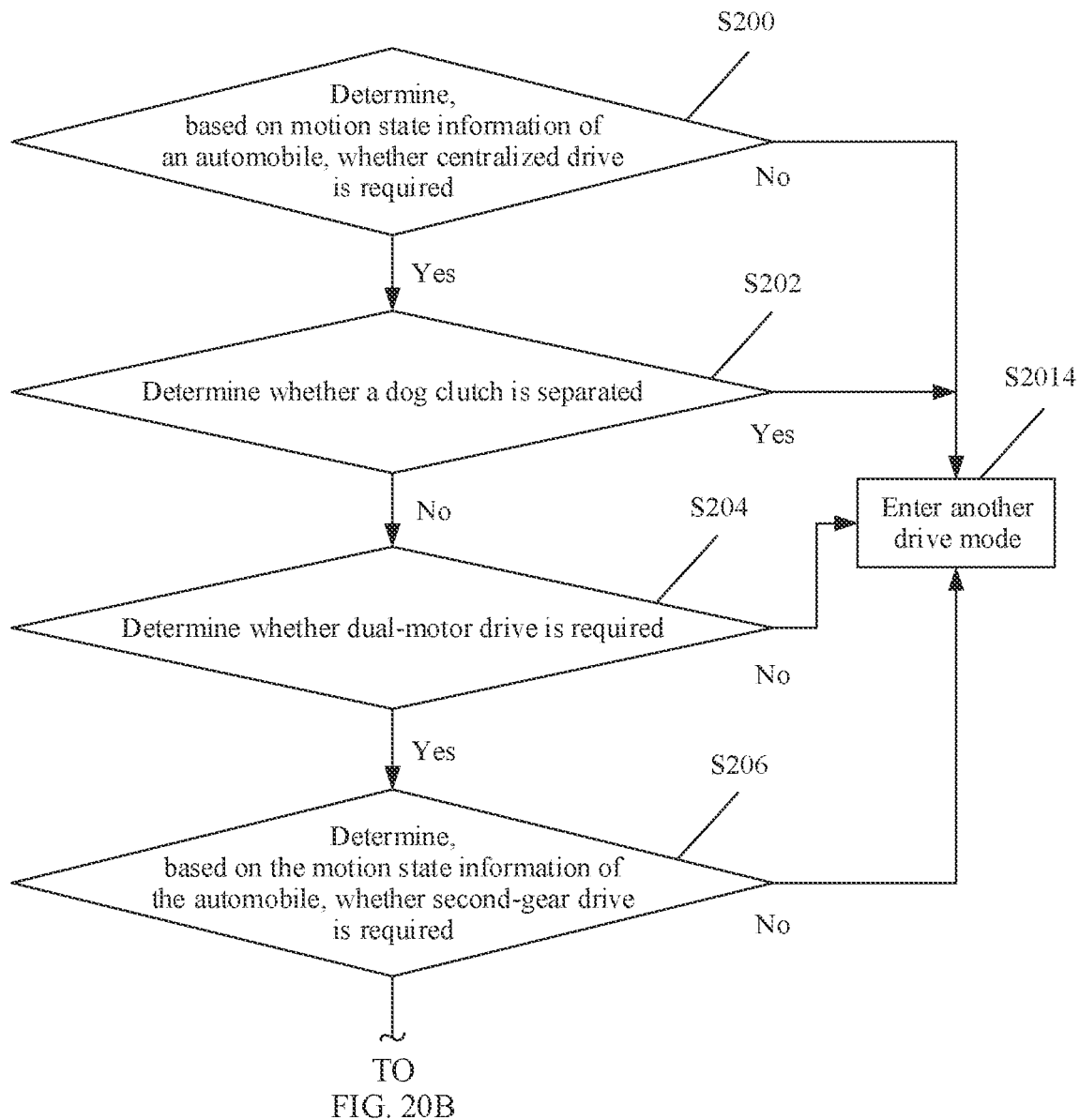
FIG. 20A and FIG. 20B are a schematic flowchart of a sixth control method for a drive apparatus according to an embodiment of this application.
Figure 20B:
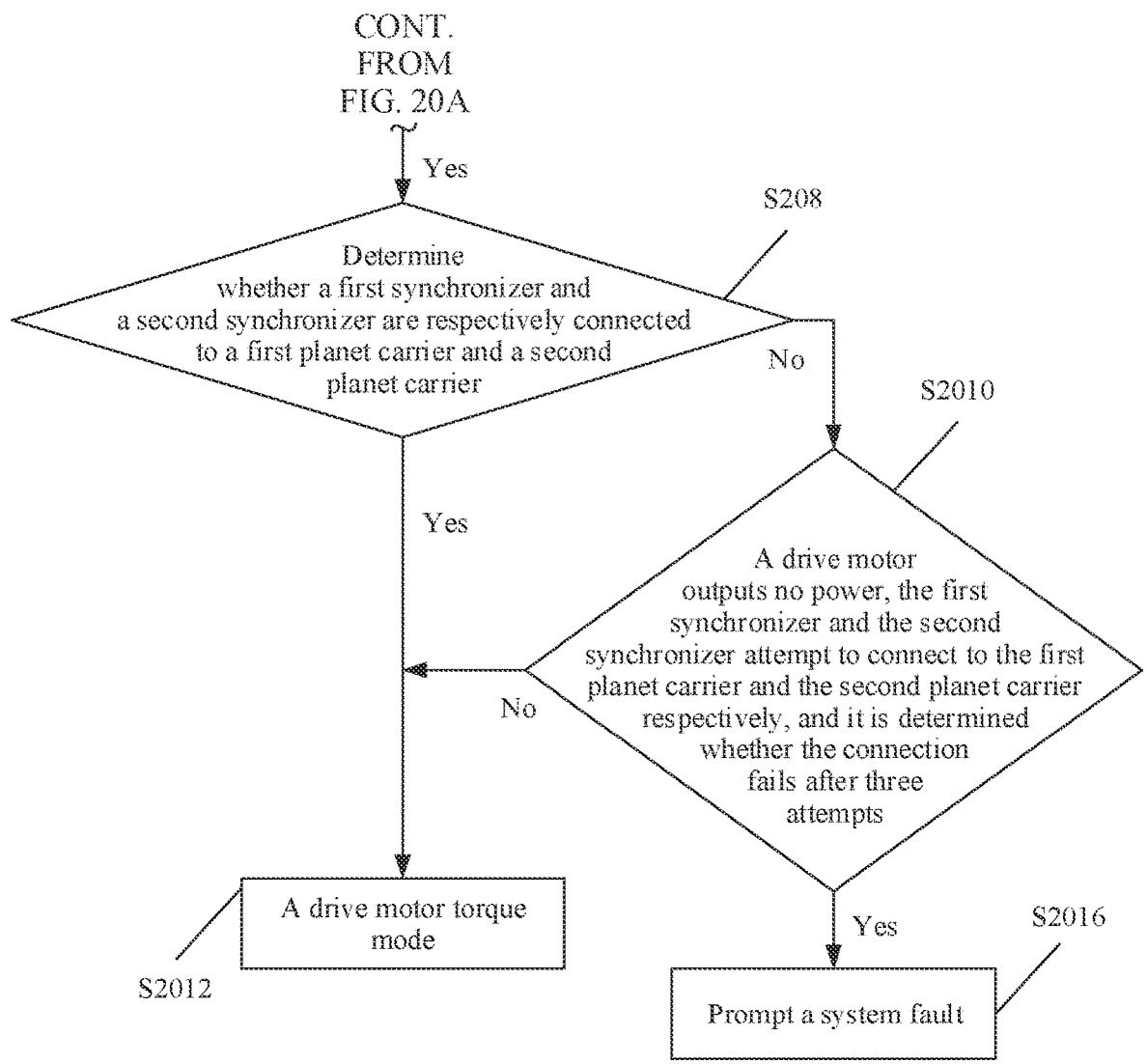

For example, the dog clutch, the first brake mechanism, and the second brake mechanism are respectively a first synchronizer and a second synchronizer, and the synchronizer is combined with a housing of the drive apparatus, so that a vehicle is at a first-gear position. With reference to a schematic flowchart of a sixth control method for a drive apparatus according to an embodiment of this application shown in FIG. 20A and FIG. 20B, how to determine and control a second-gear dual-motor centralized drive mode may be described. The following steps may be included.

Step S200: Determine, based on motion state information of an automobile, whether centralized drive is required.

Specifically, when it is determined that the centralized drive is required, step S202 is performed; and when it is determined that the centralized drive is not required, step S2014 is performed.

Step S202: Determine whether a dog clutch is separated.

Specifically, when it is determined that the dog clutch is not separated, step S204 is performed; and when it is determined that the dog clutch is separated, step S2014 is performed.

Step S204: Determine whether dual-motor drive is required.

Specifically, when it is determined that dual-motor drive is required, step S206 is performed; and when it is determined that dual-motor drive is not required, step S2014 is performed.

Step S206: Determine, based on the motion state information of the automobile, whether second-gear drive is required.

Specifically, when it is determined that second-gear drive is required, step S208 is performed; and when it is determined that second-gear drive is not required, step S2014 is performed.

Step S208: Determine whether a first synchronizer and a second synchronizer are respectively connected to a first planet carrier and a second planet carrier.

Specifically, when it is determined the first synchronizer and the second synchronizer are connected to the housing, step S2012 is performed; and when it is determined the first synchronizer and the second synchronizer are not connected to the housing, step S2010 is performed.

Step S2010: A drive motor outputs no power, the first synchronizer and the second synchronizer attempt to connect to the first planet carrier and the second planet carrier respectively, and it is determined whether the connection fails after three attempts.

Specifically, if the attempt fails after three times, step S2016 is performed; and if the attempt succeeds after three times, step S2012 is performed.

Step S2012: A drive motor torque mode.

Specifically, with reference to FIG. 11, the processor determines and implements a second-gear dual-motor centralized drive mode.

Step S2014: Enter another drive mode.

Step S2016: Prompt a system fault.

Figure 21A:
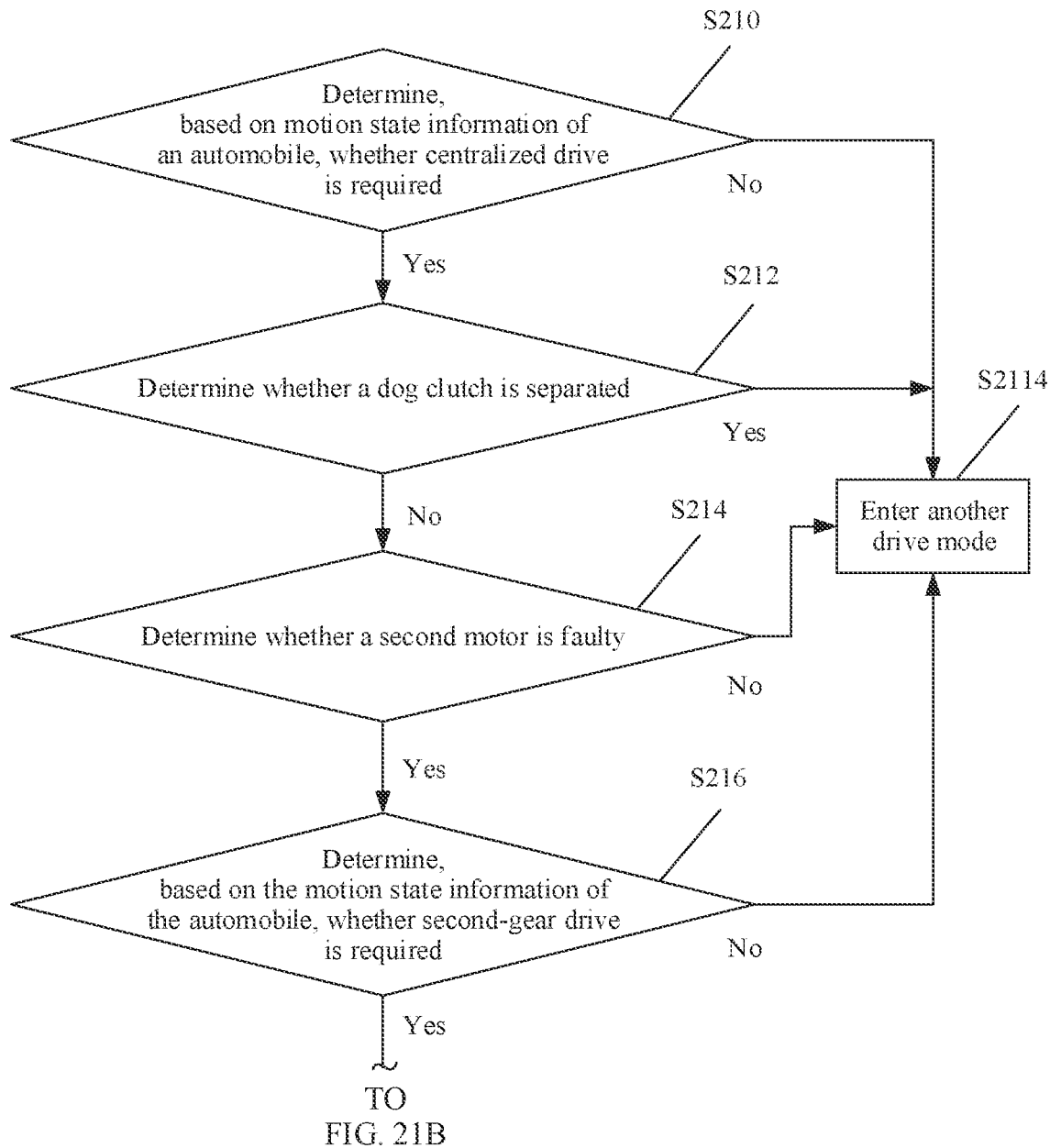
FIG. 21A and FIG. 21B are a schematic flowchart of a seventh control method for a drive apparatus according to an embodiment of this application.
Figure 21B:
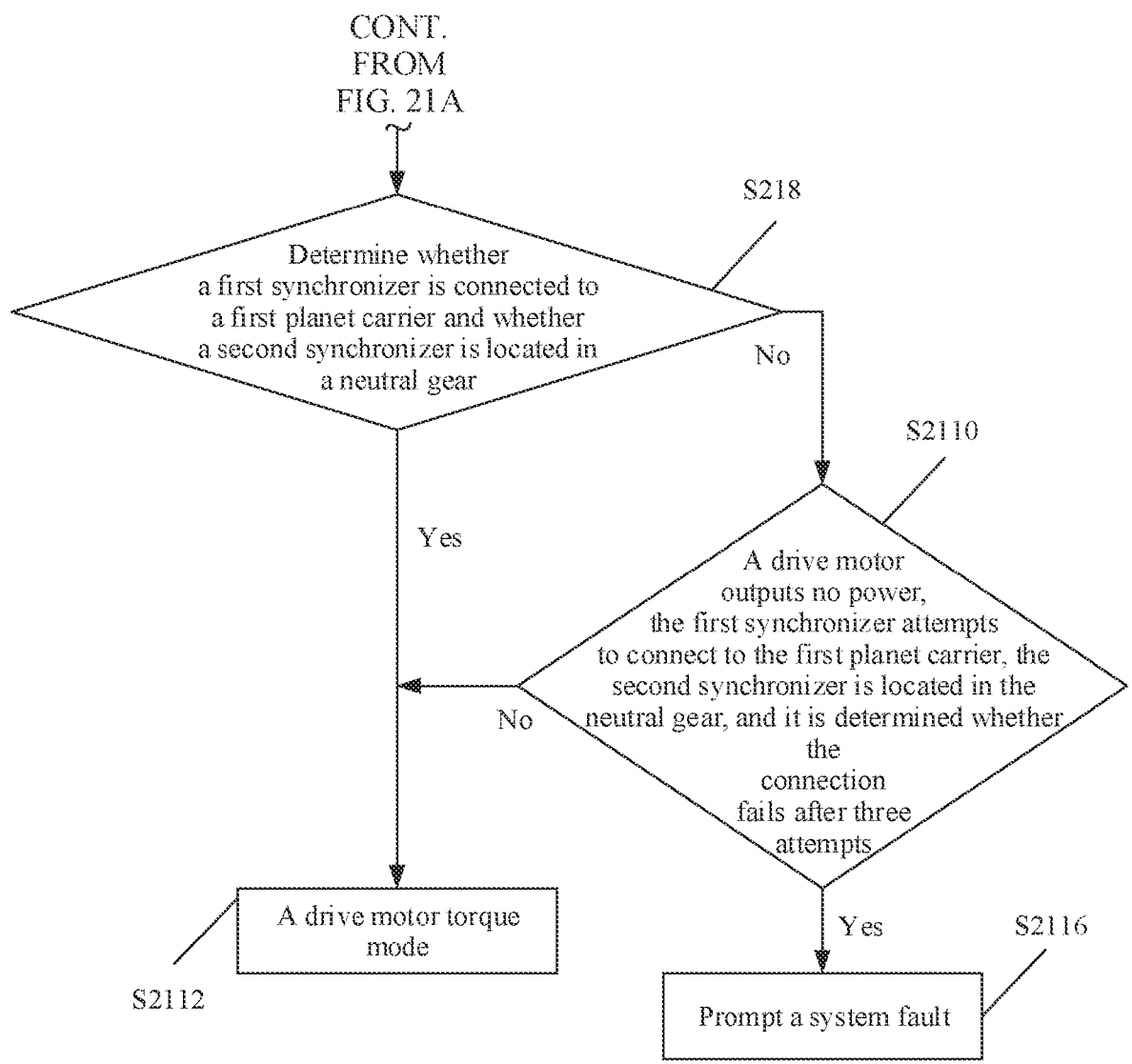

With reference to a schematic flowchart of a seventh control method for a drive apparatus according to an embodiment of this application shown in FIG. 21A and FIG. 21B, how to determine and control a second-gear first motor centralized drive mode may be described. The following steps may be included.

Step S210: Determine, based on motion state information of an automobile, whether centralized drive is required.

Specifically, when it is determined that the centralized drive is required, step S212 is performed; and when it is determined that the centralized drive is not required, step S2114 is performed.

Step S212: Determine whether a dog clutch is separated.

Specifically, when it is determined that the dog clutch is not separated, step S214 is performed; and when it is determined that the dog clutch is separated, step S2114 is performed.

Step S214: Determine whether a second motor is faulty.

Specifically, when it is determined that a fault occurs, step S216 is performed; and when it is determined that no fault occurs, step S2114 is performed.

Step S214 is not limited to determining whether the second motor is faulty, or may be used to determine a case such as whether a second synchronizer is damaged, provided that a condition for determining whether a first motor needs to be independently driven in a centralized manner is met.

Step S216: Determine, based on the motion state information of the automobile, whether second-gear drive is required.

Specifically, when it is determined that second-gear drive is required, step S218 is performed; and when it is determined that second-gear drive is not required, step S2114 is performed.

Step S218: Determine whether a first synchronizer is connected to a first planet carrier and whether the second synchronizer is located in a neutral gear.

Specifically, when it is determined the first synchronizer is connected to the first planet carrier and the second synchronizer is in the neutral gear, step S2112 is performed; and when it is determined the first synchronizer is not connected to the first planet carrier and the second synchronizer is not in the neutral gear, step S2110 is performed.

Step S2110: A drive motor outputs no power, the first synchronizer attempts to connect to the first planet carrier, the second synchronizer is in the neutral gear, and it is determined whether the connection fails after three attempts.

Specifically, if the attempt fails after three times, step S2116 is performed; and if the attempt succeeds after three times, step S2112 is performed.

Step S2112: A drive motor torque mode.

Specifically, with reference to FIG. 12, the processor determines and implements a second-gear first motor centralized drive mode.

Step S2114: Enter another drive mode.

Step S2116: Prompt a system fault.

Figure 22A:
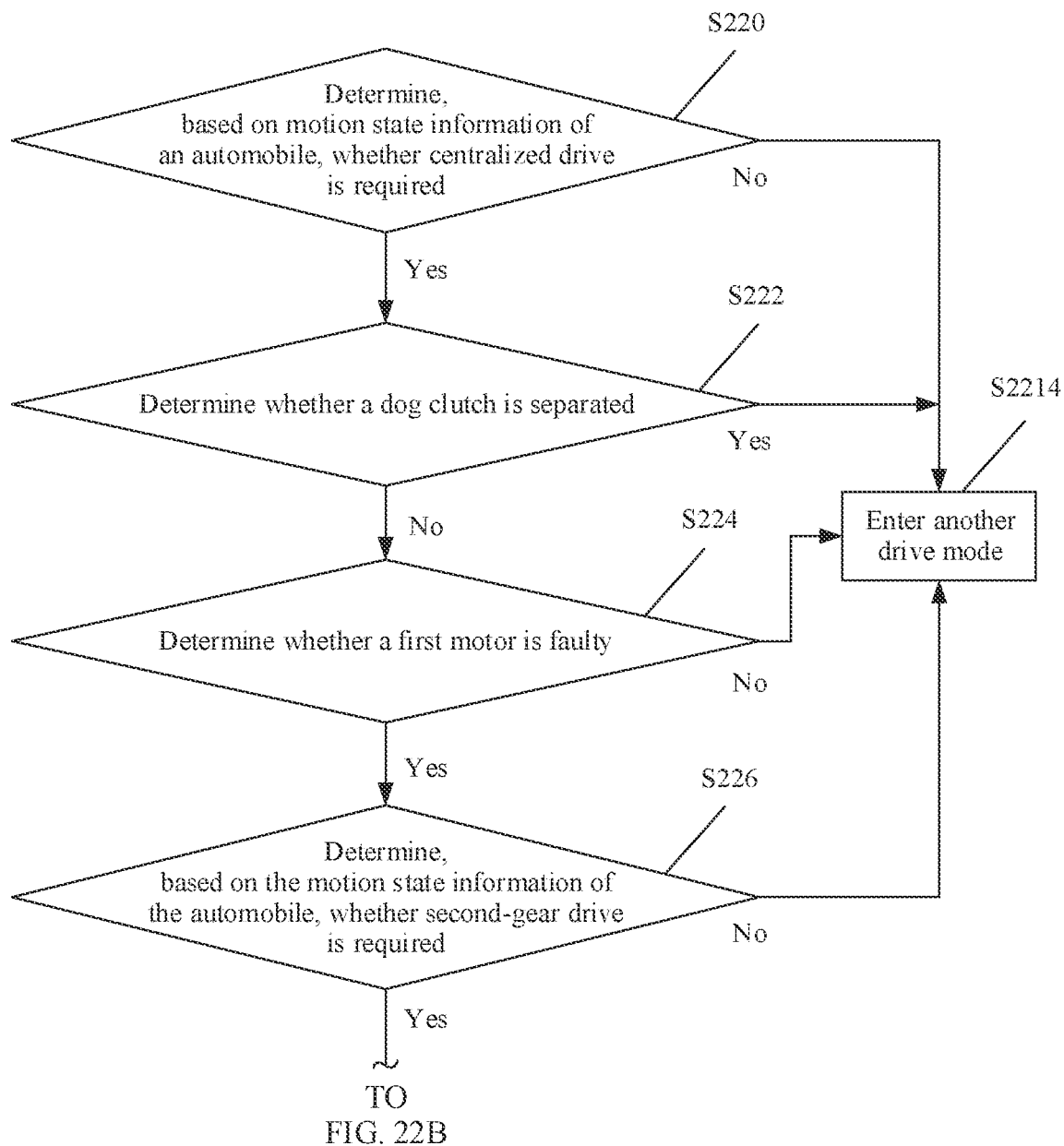
FIG. 22A and FIG. 22B are a schematic flowchart of an eighth control method for a drive apparatus according to an embodiment of this application.
Figure 22B:
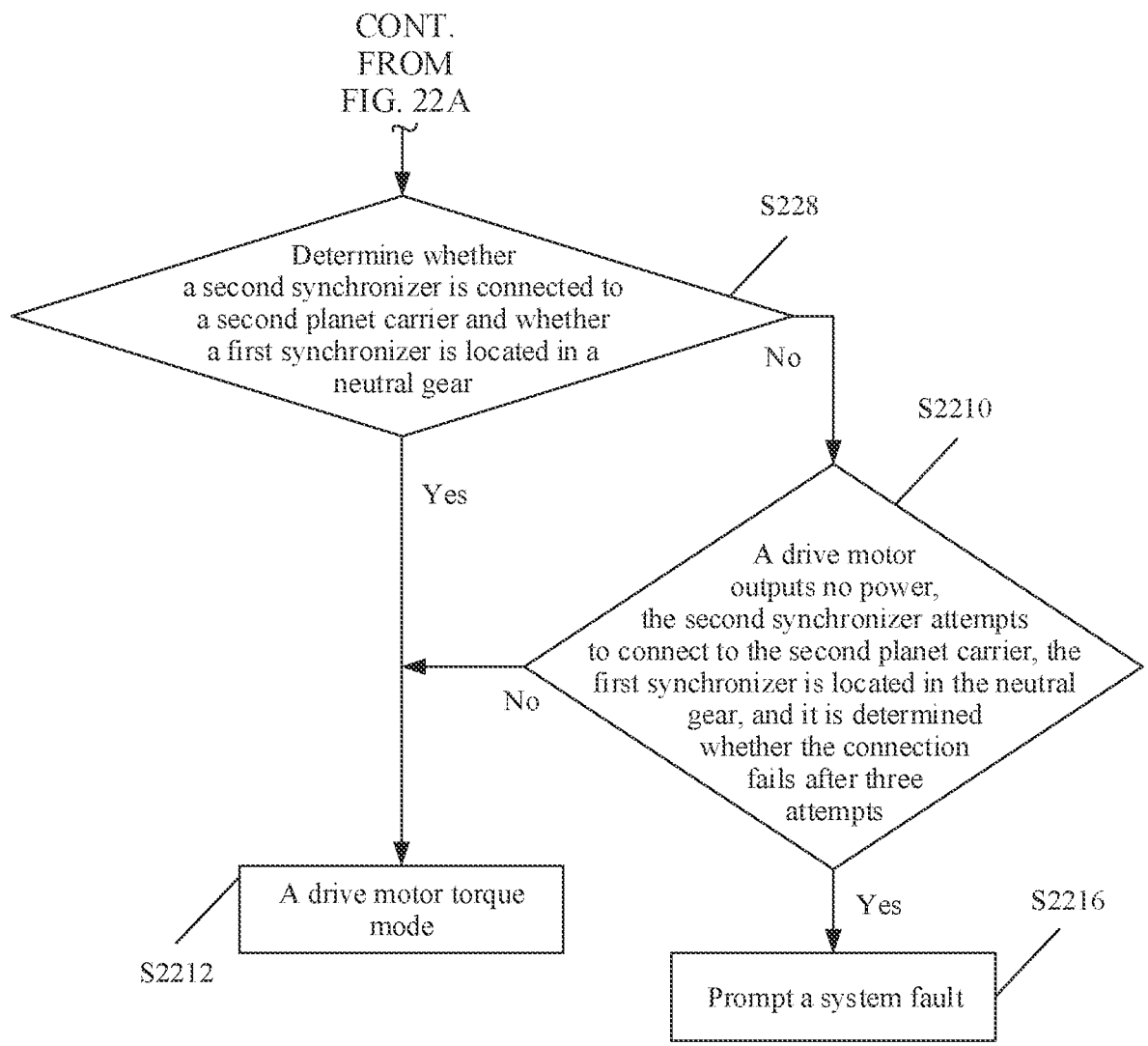

With reference to a schematic flowchart of an eighth control method for a drive apparatus according to an embodiment of this application shown in FIG. 22A and FIG. 22B, how to determine and control a second-gear second motor centralized drive mode may be described. The following steps may be included.

Step S220: Determine, based on motion state information of an automobile, whether centralized drive is required.

Specifically, when it is determined that the centralized drive is required, step S222 is performed; and when it is determined that the centralized drive is not required, step S2214 is performed.

Step S222: Determine whether a dog clutch is separated.

Specifically, when it is determined that the dog clutch is not separated, step S224 is performed; and when it is determined that the dog clutch is separated, step S2214 is performed.

Step S224: Determine whether a first motor is faulty.

Specifically, when it is determined that a fault occurs, step S226 is performed; and when it is determined that no fault occurs, step S2214 is performed.

Step S224 is not limited to determining whether the first motor is faulty, or may be used to determine a case such as whether a first synchronizer is damaged, provided that a condition for determining whether a second motor needs to be independently driven in a centralized manner is met.

Step S226: Determine, based on the motion state information of the automobile, whether second-gear drive is required.

Specifically, when it is determined that second-gear drive is required, step S228 is performed; and when it is determined that second-gear drive is not required, step S2214 is performed.

Step S228: Determine whether a second synchronizer is connected to a second planet carrier and whether the first synchronizer is located in a neutral gear.

Specifically, when it is determined the first synchronizer is connected to the second planet carrier, step S2212 is performed; and when it is determined the first synchronizer is not connected to the second planet carrier, step S2210 is performed.

Step S2210: A drive motor outputs no power, the second synchronizer attempts to connect to the second planet carrier, the first synchronizer is in the neutral gear, and it is determined whether the connection fails after three attempts.

Specifically, if the attempt fails after three times, step S2216 is performed; and if the attempt succeeds after three times, step S2212 is performed.

Step S2212: A drive motor torque mode.

Specifically, with reference to FIG. 13, the processor determines and implements a second-gear second motor centralized drive mode.

Step S2214: Enter another drive mode.

Step S2216: Prompt a system fault.

The method in embodiments of this application is described above in detail, and an apparatus in embodiments of this application is provided below.

Figure 23:
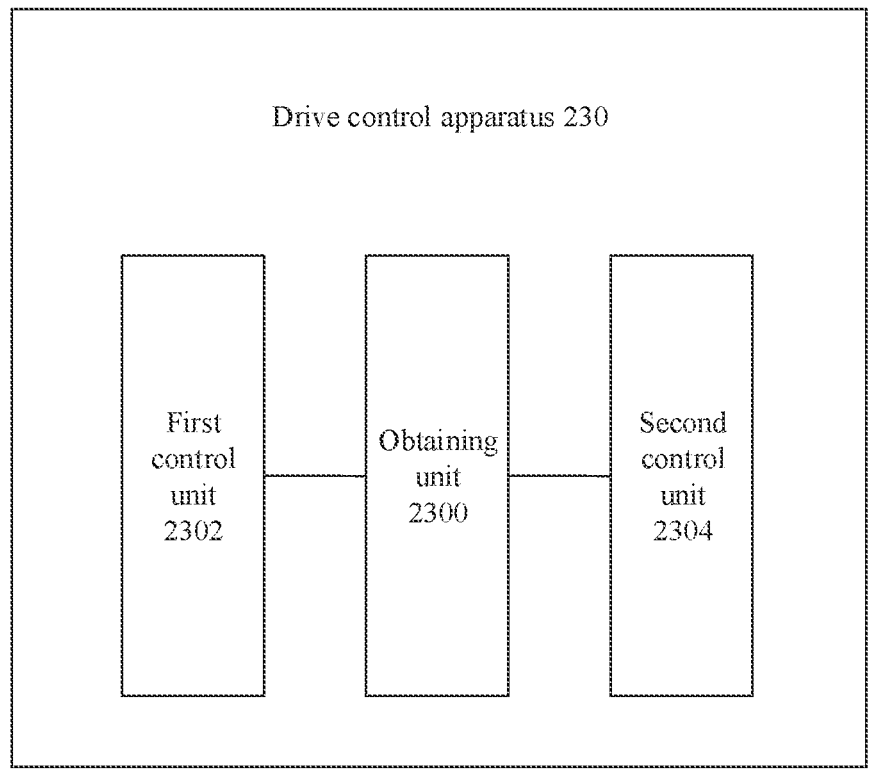
FIG. 23 is a schematic diagram of a structure of a drive control apparatus according to an embodiment of this application.

FIG. 23 is a schematic diagram of a structure of a drive control apparatus according to an embodiment of this application. The drive control apparatus 230 is configured to control the drive apparatus provided in any implementation in the foregoing method embodiments, and may include an obtaining unit 2300, a first control unit 2302, and a second control unit 2304. Detailed descriptions of the units are as follows:

The obtaining unit 2300 is configured to obtain a drive mode and a gear mode of an automobile based on motion state information of the automobile.

The first control unit 2302 is configured to control, according to the drive mode, a first output half shaft and a second output half shaft to be engaged or disengaged.

The second control unit 2304 is configured to control, by using a first brake mechanism, a first gear ring to be locked or control a first gear ring to be connected to a first planet carrier according to the gear mode, and/or control, by using a second brake mechanism, a second gear ring to be locked or control a second gear ring to be connected to a second planet carrier.

In a possible implementation, when the drive mode obtained by the obtaining unit 2300 is a distributed drive mode, and the gear mode is a first-gear drive mode, the first control unit is 2302 is specifically configured to control the first output half shaft and the second output half shaft to be disengaged.

The second control unit is 2304 is specifically configured to control, by using the first brake mechanism, the first gear ring to be locked, and control, by using the second brake mechanism, the second gear ring to be locked.

In a possible implementation, when the drive mode obtained by the obtaining unit 2300 is a distributed drive mode, and the gear mode is a first-gear drive mode, the first control unit is 2302 is specifically configured to control the first output half shaft and the second output half shaft to be disengaged.

The second control unit is 2304 specifically configured to control, by using the first brake mechanism, the first gear ring to be connected to the first planet carrier, and control, by using the second brake mechanism, the second gear ring to be connected to the second planet carrier.

In a possible implementation, when the drive mode obtained by the obtaining unit 2300 is a centralized drive mode, and the gear mode is a first-gear drive mode, the first control unit is 2302 is specifically configured to control the first output half shaft and the second output half shaft to be engaged.

The second control unit is 2304 is specifically configured to: control, by using the first brake mechanism, the first gear ring to be locked, where the second brake mechanism is located in a neutral gear; or control, by using the second brake mechanism, the second gear ring to be locked, where the first brake mechanism is located in a neutral gear; or control, by using the first brake mechanism, the first gear ring to be locked, and control, by using the second brake mechanism, the second gear ring to be locked.

In a possible implementation, when the drive mode obtained by the obtaining unit 2300 is a centralized drive mode, and the gear mode is a second-gear drive mode, the first control unit is 2302 specifically configured to control the first output half shaft and the second output half shaft to be engaged.

The second control unit 2304 is specifically configured to: control, by using the first brake mechanism, the first gear ring to be connected to the first planet carrier, where the second brake mechanism is located in the neutral gear; or control, by using the second brake mechanism, the second gear ring to be connected to the second planet carrier, where the first brake mechanism is located in the neutral gear: or control, by using the first brake mechanism, the first gear ring to be connected to the first planet carrier, and control, by using the second brake mechanism, the second gear ring to be connected to the second planet carrier.

It should be noted that, for an implementation of each unit, further refer to corresponding descriptions of the structure of the drive apparatus in the method embodiments shown in FIG. 2A to FIG. 22B, and details are not described herein again.

Figure 24:
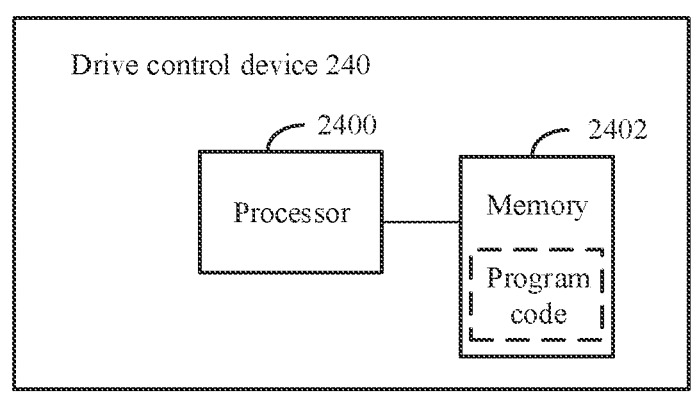
FIG. 24 is a schematic diagram of a structure of a drive control device according to an embodiment of this application.

FIG. 24 is a schematic diagram of a structure of a drive control device according to an embodiment of this application. The drive control device 240 includes at least one processor 2400 and a memory 2402.

In a possible implementation, the drive control device 240 may be a small and perfect microcomputer system that is formed by integrating a single-chip microcomputer, or a central processing unit (CPU) (namely, the processor 2400) that has a data processing capability, a random access memory RAM, a read-only memory ROM, a plurality of I/O interfaces and interrupt systems, a timer/counter, and other functions (may further including circuits such as a display drive circuit, a pulse width modulation circuit, an analog multiplexer, and an A/D converter) into a piece of silicon wafer. The memory 2402 may include the RAM and the ROM.

The memory 2402 may store program code, and the at least one processor 2400 may invoke the program code to execute the control method for the drive apparatus in the embodiment in FIG. 23.

Optionally, the drive control device 240 may be used in an automobile or a vehicle in embodiments of this application, for example, in an in-vehicle system.

Figure 25:
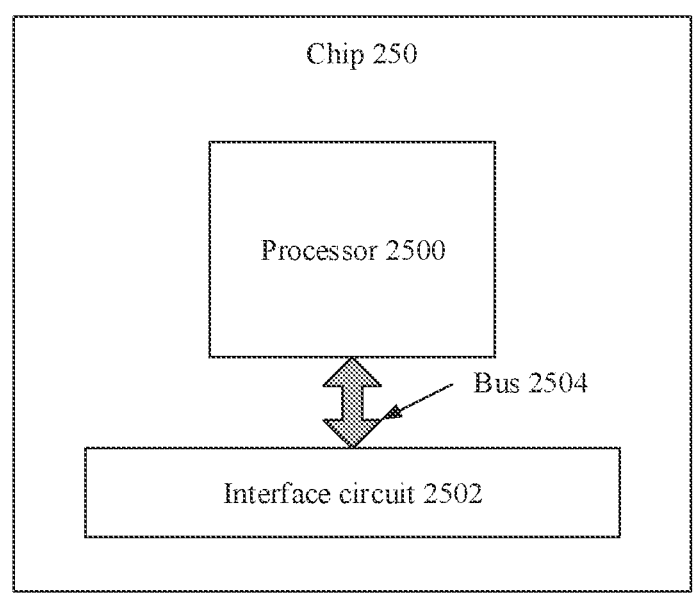
FIG. 25 is a schematic diagram of a structure of a chip according to an embodiment of this application.

Refer to FIG. 25, an embodiment of this application further provides a chip 250, including one or more processors 2500 and an interface circuit 2502. Optionally, the chip 250 may further include a bus 2504. The processor 2500 may be an integrated circuit chip and has a signal processing capability.

In an implementation process, the steps in the foregoing method may be completed by using a hardware integrated logic circuit in the processor 2500 or instructions in a form of software. The processor 2500 may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor 2500 may implement or perform the methods and steps that are disclosed in embodiments of this application. The general-purpose processor may be a microprocessor, or the processor may be any conventional processor or the like.

The interface circuit 2502 may send or receive data, instructions, or information. The processor 2500 may process data, instructions, or other information received through the interface circuit 2502, and send, through the interface circuit 2502, information obtained after processing.

Optionally, the chip 250 further includes a memory. The memory may include a read-only memory and a random access memory, and provide operation instructions and data for the processor. A part of the memory may further include a non-volatile random access memory (NVRAM).

Optionally, the chip 250 may be used in an automobile or a vehicle in embodiments of this application, for example, in an in-vehicle system.

It should be noted that functions corresponding to each of the processor 2500 and the interface circuit 2502 may be implemented by using a hardware design, may be implemented by using a software design, or may be implemented by combining software and hardware. This is not limited herein.

Embodiments of this application further provide a computer-readable storage medium. All or some of the procedures in the foregoing method embodiments may be completed by a computer program instructing related hardware. The program may be stored in the foregoing computer storage medium. When the program is executed, the procedures of the foregoing method embodiments may be included. The computer-readable storage medium includes: any medium that can store program code, such as a read-only memory (read-only memory, ROM) or a random access memory (random access memory, RAM). A computer program or computer instructions in the computer-readable storage medium may be invoked and executed by the drive control device 240 (for example, a single-chip microcomputer) and the chip 250.

A sequence of the steps of the method in embodiments of this application may be adjusted, combined, or removed based on an actual requirement.

The modules in the apparatus in embodiments of this application may be combined, divided, and deleted based on an actual requirement.

In conclusion, the foregoing embodiments are merely intended for describing the technical solutions of this application, but not for limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A drive apparatus, comprising a first variable speed drive mechanism, a second variable speed drive mechanism, a first output half shaft, and a second output half shaft, wherein:

the first variable speed drive mechanism comprises a first reduction gear, a first planetary gear system, and a first brake mechanism, and the second variable speed drive mechanism comprises a second reduction gear, a second planetary gear system, and a second brake mechanism;

the first planetary gear system comprises a first sun gear, a first gear ring, a first planetary gear engaged between the first sun gear and the first gear ring, and a first planet carrier connected to the first planetary gear;

the first reduction gear is engaged with the first sun gear, and the first planet carrier is connected to the first output half shaft;

the first brake mechanism is engaged with the first gear ring, and is configured to control the first gear ring to be locked or to control the first gear ring to be connected to the first planet carrier;

the second planetary gear system comprises a second sun gear, a second gear ring, a second planetary gear engaged between the second sun gear and the second gear ring, and a second planet carrier connected to the second planetary gear;

the second reduction gear is engaged with the second sun gear, and the second planet carrier is connected to the second output half shaft;

the second brake mechanism is engaged with the second gear ring, and is configured to control the second gear ring to be locked or control the second gear ring to be connected to the second planet carrier; and the first output half shaft and the second output half shaft are operable to be switched between engagement and disengagement.

2. The drive apparatus according to claim 1, wherein the first brake mechanism is operable to be connected to a housing of the drive apparatus or the first planet carrier; and when the first brake mechanism is connected to the housing of the drive apparatus, the first gear ring is locked; and when the first brake mechanism is connected to the first planet carrier, a rotation speed of the first sun gear, a rotation speed of the first planetary gear, and a rotation speed of the first gear ring are the same.

3. The drive apparatus according to claim 1 wherein the second brake mechanism is operable to be connected to a housing of the drive apparatus or the second planet carrier; and when the second brake mechanism is connected to the housing of the drive apparatus, the second gear ring is locked; and when the second brake mechanism is connected to the second planet carrier, a rotation speed of the second sun gear, a rotation speed of the second planetary gear, and a rotation speed of the second gear ring are the same.

4. The drive apparatus according to claim 1, wherein switching between the engagement and the disengagement is implemented between the first output half shaft and the second output half shaft by using a dog clutch.

5. An automobile, comprising two front wheels, two rear wheels, a first axle connecting the two front wheels, a second axle connecting the two rear wheels, and a dual-motor drive system, wherein the dual-motor drive system comprises a first motor, a second motor, and a drive apparatus, where the drive apparatus comprises:

a first variable speed drive mechanism, a second variable speed drive mechanism, a first output half shaft, and a second output half shaft, wherein:

the first variable speed drive mechanism comprises a first reduction gear, a first planetary gear system, and a first brake mechanism, and the second variable speed drive mechanism comprises a second reduction gear, a second planetary gear system, and a second brake mechanism;

the first planetary gear system comprises a first sun gear, a first gear ring, a first planetary gear engaged between the first sun gear and the first gear ring, and a first planet carrier connected to the first planetary gear;

the first reduction gear is engaged with the first sun gear, and the first planet carrier is connected to the first output half shaft;

the first brake mechanism is engaged with the first gear ring, and is configured to control the first gear ring to be locked or to control the first gear ring to be connected to the first planet carrier:

the second planetary gear system comprises a second sun gear, a second gear ring, a second planetary gear engaged between the second sun gear and the second gear ring, and a second planet carrier connected to the second planetary gear;

the second reduction gear is engaged with the second sun gear, and the second planet carrier is connected to the second output half shaft;

the second brake mechanism is engaged with the second gear ring, and is configured to control the second gear ring to be locked or control the second gear ring to be connected to the second planet carrier; and the first output half shaft and the second output half shaft are operable to be switched between engagement and disengagement; and wherein:

the first motor is connected to a first input shaft, the second motor is connected to a second input shaft, a first reduction gear is connected to the first input shaft, and a second reduction gear is connected to the second input shaft; and the drive apparatus of the dual-motor drive system is integrated on at least one of the first axle or the second axle.

6. A drive apparatus control method, used for controlling a drive apparatus, comprising:

obtaining a drive mode and a gear mode of an automobile based on motion state information of the automobile;

controlling, according to the drive mode, a first output half shaft and a second output half shaft to be engaged or disengaged; and at least one of controlling, by using a first brake mechanism, a first gear ring to be locked or controlling a first gear ring to be connected to a first planet carrier according to the gear mode, or controlling, by using a second brake mechanism, a second gear ring to be locked or controlling a second gear ring to be connected to a second planet carrier, wherein;

the drive apparatus comprises;

a first variable speed drive mechanism, a second variable speed drive mechanism, a first output half shaft, and a second output half shaft;

the first variable speed drive mechanism comprises a first reduction gear, a first planetary gear system, and a first brake mechanism;

the second variable speed drive mechanism comprises a second reduction gear, a second planetary gear system and a second brake mechanism;

the first planetary gear system comprises a first sun gear, a first gear ring, a first planetary gear engaged between the first sun gear and the first gear ring, and a first planet carrier connected to the first planetary gear;

the first reduction gear is engaged with the first sun gear, and the first planet carrier is connected to the first output half shaft;

the first brake mechanism is engaged with the first gear ring, and is configured to control the first gear ring to be locked or IQ control the first gear ring to be connected to the first planet carrier;

the second planetary gear system comprises a second sun gear, a second gear ring, a second planetary gear engaged between the second sun gear and the second gear ring, and a second planet carrier connected to the second planetary gear;

the second reduction gear is engaged with the second sun gear, and the second planet carrier is connected to the second output half shaft;

the second brake mechanism is engaged with the second gear ring, and is configured to control the second gear ring to be locked or control the second gear ring to be connected to the second planet carrier; and the first output half shaft and the second output half shaft are operable to be switched between engagement and disengagement.

7. The method according to claim 6, wherein when the drive mode is a distributed drive mode, and the gear mode is a first-gear drive model;

the controlling, according to the drive mode, a first output half shaft and a second output half shaft to be engaged or disengaged comprises controlling the first output half shaft and the second output half shaft to be disengaged; and the at least one of controlling, by using a first brake mechanism, a first gear ring to be locked or controlling a first gear ring to be connected to a first planet carrier according to the gear mode, or controlling, by using a second brake mechanism, a second gear ring to be locked or controlling a second gear ring to be connected to a second planet carrier comprises controlling, by using the first brake mechanism, the first gear ring to be locked, and controlling, by using the second brake mechanism, the second gear ring to be locked.

8. The method according to claim 6, wherein when the drive mode is a distributed drive mode, and the gear mode is a second-gear drive mode;

the controlling, according to the drive mode, a first output half shaft and a second output half shaft to be engaged or disengaged comprises controlling the first output half shaft and the second output half shaft to be disengaged; and the at least one of controlling, by using a first brake mechanism, a first gear ring to be locked or controlling a first gear ring to be connected to a first planet carrier according to the gear mode, or controlling, by using a second brake mechanism, a second gear ring to be locked or controlling a second gear ring to be connected to a second planet carrier comprises controlling, by using the first brake mechanism, the first gear ring to be connected to the first planet carrier, and controlling, by using the second brake mechanism, the second gear ring to be connected to the second planet carrier.

9. The method according to claim 6, wherein when the drive mode is a centralized drive mode, and the gear mode is a first-gear drive mode;

the controlling, according to the drive mode, a first output half shaft and a second output half shaft to be engaged or disengaged comprises controlling the first output half shaft and the second output half shaft to be engaged; and the at least one of controlling, by using a first brake mechanism, a first gear ring to be locked or controlling a first gear ring to be connected to a first planet carrier according to the gear mode, or controlling, by using a second brake mechanism, a second gear ring to be locked or controlling a second gear ring to be connected to a second planet carrier comprises:

controlling, by using the first brake mechanism, the first gear ring to be locked, wherein the second brake mechanism is located in a neutral gear; or controlling, by using the second brake mechanism, the second gear ring to be locked, wherein the first brake mechanism is located in a neutral gear; or controlling, by using the first brake mechanism, the first gear ring to be locked and controlling, by using the second brake mechanism, the second gear ring to be locked.

10. The method according to claim 6, wherein when the drive mode is a centralized drive mode, and the gear mode is a second-gear drive mode;

the controlling, according to the drive mode, a first output half shaft and a second output half shaft to be engaged or disengaged comprises controlling the first output half shaft and the second output half shaft to be engaged; and the at least one of controlling, by using a first brake mechanism, a first gear ring to be locked or controlling a first gear ring to be connected to a first planet carrier according to the gear mode, or controlling, by using a second brake mechanism, a second gear ring to be locked or controlling a second gear ring to be connected to a second planet carrier comprises:

controlling, by using the first brake mechanism, the first gear ring to be connected to the first planet carrier, wherein the second brake mechanism is located in a neutral gear; or controlling, by using the second brake mechanism, the second gear ring to be connected to the second planet carrier, wherein the first brake mechanism is located in a neutral gear; or controlling, by using the first brake mechanism, the first gear ring to be connected to the first planet carrier, and controlling, by using the second brake mechanism, the second gear ring to be connected to the second planet carrier.

11. The method according to claim 6, wherein;

the first brake mechanism is operable to be connected to a housing of the drive apparatus or the first planet carrier; and when the first brake mechanism is connected to the housing of the drive apparatus, the first gear ring is locked; and when the first brake mechanism is connected to the first planet carrier, a rotation speed of the first sun gear, a rotation speed of the first planetary gear, and a rotation speed of the first gear ring are the same.

12. The method according to claim 6, wherein the second brake mechanism is operable to be connected to a housing of the drive apparatus or the second planet carrier; and when the second brake mechanism is connected to the housing of the drive apparatus, the second gear ring is locked; and when the second brake mechanism is connected to the second planet carrier, a rotation speed of the second sun gear, a rotation speed of the second planetary gear, and a rotation speed of the second gear ring are the same.

13. The method according to claim 6, wherein switching between the engagement and the disengagement is implemented between the first output half shaft and the second output half shaft by using a dog clutch.

* * * * *

UNITED STATES PATENT AND TRADEMARK OFFICE
CERTIFICATE OF CORRECTION

PATENT NO.        : 12,276,324 B2
APPLICATION NO.   : 17/989963
DATED             : April 15, 2025
INVENTOR(S)       : Benben Chai, Fengyu Liu and Yihong Zheng It is certified that error appears in the above-identified patent and that said Letters Patent is hereby corrected as shown below:

In the Claims

In Column 30, In Line 7 (Approx.), In Claim 5, delete "carrier:" and insert -- carrier; --.

In Column 30, In Line 45, In Claim 6, delete "wherein;" and insert -- wherein: --.

In Column 30, In Line 46, In Claim 6, delete "comprises;" and insert -- comprises: --.

In Column 30, In Line 66, In Claim 6, delete "IQ" and insert -- to --.

In Column 31, In Line 18 (Approx.), In Claim 7, delete "model;" and insert -- mode: --.

In Column 31, In Line 37 (Approx.), In Claim 8, delete "mode;" and insert -- mode: --.

In Column 31, In Line 56 (Approx.), In Claim 9, delete "mode;" and insert -- mode: --.

In Column 32, In Line 14 (Approx.), In Claim 10, delete "mode;" and insert -- mode: --.

In Column 32, In Line 40 (Approx.), In Claim 11, delete "wherein;" and insert -- wherein: --.

Signed and Sealed this
Twenty-ninth Day of July, 2025

Coke Morgan Stewart
*Acting Director of the United States Patent and Trademark Office*